(12) United States Patent
Grant et al.

(10) Patent No.: US 9,974,113 B2
(45) Date of Patent: May 15, 2018

(54) SYSTEMS AND METHODS PROVIDING IMPROVED SUCCESS RATE FOR RRC CONNECTION REESTABLISHMENTS

(71) Applicant: Telefonaktiebolaget L M Ericsson (publ), Stockholm (SE)

(72) Inventors: Stephen Grant, Pleasanton, CA (US); Tarmo Kuningas, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/658,530

(22) Filed: Jul. 25, 2017

(65) Prior Publication Data

US 2017/0325279 A1 Nov. 9, 2017

Related U.S. Application Data

(63) Continuation of application No. 14/565,544, filed on Dec. 10, 2014, now Pat. No. 9,730,264.

(51) Int. Cl.
*H04W 4/00* (2018.01)
*H04W 76/02* (2009.01)
(Continued)

(52) U.S. Cl.
CPC ....... *H04W 76/19* (2018.02); *H04W 36/0033* (2013.01); *H04W 36/0055* (2013.01); *H04W 76/028* (2013.01); *H04W 88/08* (2013.01)

(58) Field of Classification Search
CPC ........... H04W 76/028; H04W 36/0033; H04W 36/0055; H04W 88/08
See application file for complete search history.

(56) References Cited

U.S. PATENT DOCUMENTS 9,730,264 B2 8/2017 Grant et al.
2004/0116110 A1 6/2004 Amerga et al.
(Continued)

FOREIGN PATENT DOCUMENTS

WO 20130033909 A1 3/2013
WO 20140058139 A1 4/2014

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.8.0, Jun. 2014, 3GPP Organizational Partners, 354 pages.
(Continued)

*Primary Examiner* — Moustapha Diaby
(74) *Attorney, Agent, or Firm* — Sage Patent Group

(57) ABSTRACT

Systems and methods that provide improved success rates for connection reestablishments in a cellular communications system are disclosed. Embodiments of a radio access node in a cellular communications system enabling connection reestablishment for a wireless device to a target cell controlled by the radio access node are disclosed. In some embodiments, the radio access node is operative to: (a) perform a wireless device context fetch for a context for the wireless device from two or more candidate source cells of the wireless device in response to a connection reestablishment request from the wireless device and (b) receive a wireless device context from at least one of the two or more candidate source cells of the wireless device in response to performing the wireless device context fetch. By performing multiple context fetches, the radio access node mitigates the problem of physical cell identifier ambiguity.

12 Claims, 14 Drawing Sheets

(51) Int. Cl.
*H04W 36/00* (2009.01)
*H04W 88/08* (2009.01)

(56) References Cited

U.S. PATENT DOCUMENTS

| | | |
|---|---|---|
| 2011/0250892 A1 | 10/2011 | Gupta et al. |
| 2012/0207121 A1* | 8/2012 | Dalsgaard ............. H04L 5/0007 370/329 |
| 2012/0269174 A1 | 10/2012 | Yang et al. |
| 2013/0182563 A1 | 7/2013 | Johansson et al. |
| 2013/0273918 A1 | 10/2013 | Watanabe |
| 2014/0204733 A1 | 7/2014 | Takahashi et al. |
| 2014/0301360 A1 | 10/2014 | Bontu et al. |
| 2016/0119828 A1* | 4/2016 | Dalsgaard ........... H04W 76/028 455/444 |

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.9.0, Sep. 2014, 3GPP Organizational Partners, 356 pages.

Non-Final Office Action for U.S. Appl. No. 14/565,544, dated Jul. 28, 2016, 26 pages.

Non-Final Office Action for U.S. Appl. No. 14/565,544, dated Feb. 8, 2017, 22 pages.

Notice of Allowance for U.S. Appl. No. 14/565,544, dated Apr. 7, 2017, 9 pages.

\* cited by examiner

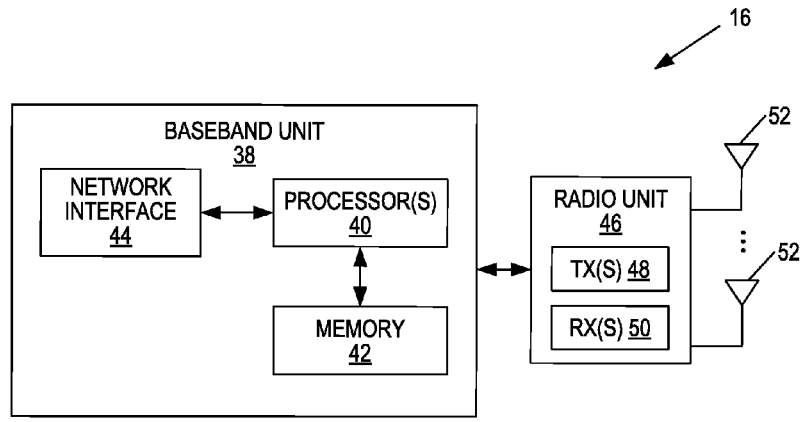
FIG. 14
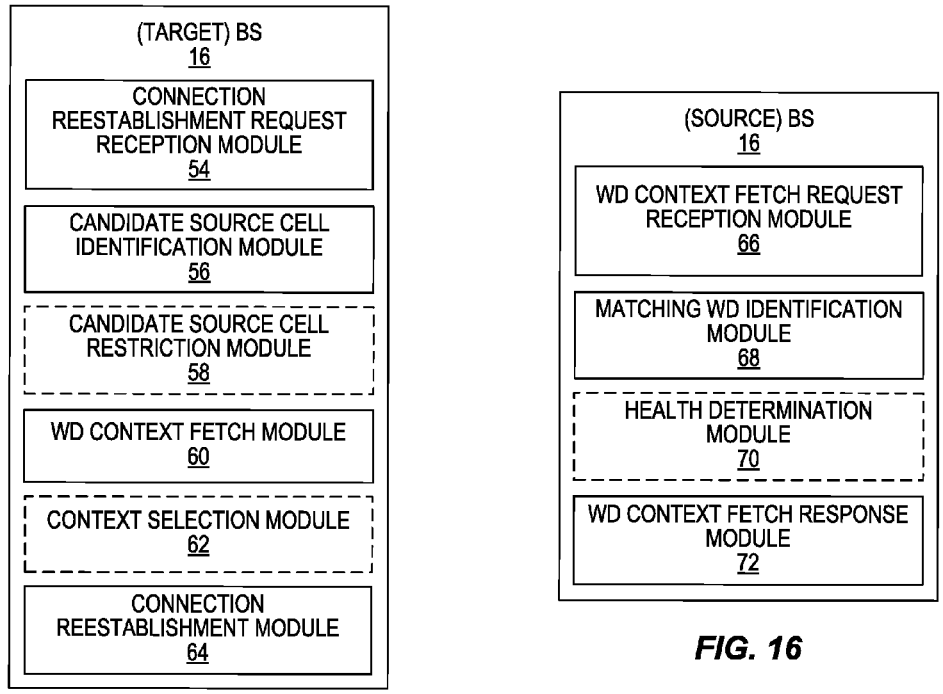
FIG. 15
FIG. 16

SYSTEMS AND METHODS PROVIDING IMPROVED SUCCESS RATE FOR RRC CONNECTION REESTABLISHMENTS

RELATED APPLICATIONS

This application is a continuation of U.S. patent application Ser. No. 14/565,544, filed Dec. 10, 2014, issued as U.S. Pat. No. 9,730,264 the disclosure of which is hereby incorporated herein by reference in its entirety.

TECHNICAL FIELD

The present disclosure relates to a cellular communications system and, more particularly, a Radio Resource Control (RRC) connection reestablishment procedure for a cellular communications system.

BACKGROUND

In radio access networks, it is commonplace to have procedures for a User Equipment device (UE) to reestablish connection to a server (e.g., a radio access node) if a connection between the UE and the radio access network is lost. The loss of the connection is typically due to poor radio conditions, e.g., low signal strength, high interference, or both. In $3^{rd}$ Generation Partnership Project (3GPP) Long Term Evolution (LTE) systems, one such procedure is the so-called Radio Resource Control (RRC) Connection Reestablishment procedure as defined in Section 5.3.7 of 3GPP Technical Specification (TS) 36.331 version 11.9.0 (Release 11). One trigger for initiating an RRC Connection Reestablishment is for the UE to declare a Radio Link Failure (RLF). An RLF is declared if the UE deems that the radio conditions are poor enough that reliable reception of the downlink control channel (i.e., the Physical Downlink Control Channel (PDCCH)) is not possible.

FIG. 1 illustrates one example of an RRC Connection Reestablishment for a UE that declares an RLF in a single-band scenario (i.e., there is only one frequency band used by all cells). As illustrated, in this example, the UE is on the edge of Cell A moving toward Cell B. Before a handover is initiated to handover the UE from Cell A to Cell B, or before handover is completed successfully, the UE declares an RLF while still being served by Cell A. Upon RLF declaration, the UE initiates a cell search and, in this example, the UE reselects Cell B since, in this example, the UE measures better signal strength/quality for Cell B as compared to Cell A. The UE then attempts an RRC Connection Reestablishment to Cell B. In this case, Cell B is referred to herein as a target cell for the RRC Connection Reestablishment and Cell A is referred to herein as a source cell. After executing a random access procedure to Cell B (the newly reselected cell), the UE sends an RRC Connection Reestablishment Request message containing a Physical Cell Identifier (PCI) to Cell A (i.e., the previous serving cell of the UE, which is also referred to as the source cell) and a Cell Radio Network Temporary Identifier (C-RNTI) assigned to the UE when the UE was being served by Cell A. In this example, Cell A has a PCI value of X.

The C-RNTI uniquely identifies the UE while the UE is being served by a given cell, and is used for several purposes including addressing the user when downlink data is available for transmission. According to 3GPP standards, the C-RNTI is a 16-bit value, meaning 32,768 values are available. Every cell uses the same set of C-RNTIs, and it is up to the implementation on how the C-RNTIs are allocated and reused as UEs go in and out of RRC_CONNECTED state. With this scheme, the C-RNTI used for a UE in a given cell has meaning within that cell. The same C-RNTI could be used in another cell to address a different UE.

Assuming that Cell B has not already obtained the context of the UE through handover preparation or other methods, Cell B (or more specifically the radio access node (e.g., the enhanced or evolved Node B (eNB)) controlling Cell B) must obtain (fetch) the context of the UE from the previous serving cell (i.e., Cell A) upon receipt of the RRC Connection Reestablishment Request message. The context of the UE is information required in order to continue the data session with Cell B as the serving cell. The UE context contains such information as UE capability, security context, information related to established bearers, etc.

Using current technology, Cell B determines the cell from which to fetch the UE context based on at least two pieces of information, namely: (1) a PCI of Cell A sent by the UE in the RRC Connection Reestablishment Request message and (2) a neighbor list stored at Cell B. The neighbor list contains a list of Pas mapped to globally unique cell identifiers (i.e., Evolved Universal Terrestrial Radio Access Network (E-UTRAN) Global Cell Identifiers (ECG's)) of the neighboring cells of Cell B. In the simple example of FIG. 1, the neighbor list of Cell B would contain PCI X and PCI Z mapped to the ECG's of Cells A and C, respectively. Hence, when Cell B receives PCI X in the RRC Connection Reestablishment Request message, Cell B knows that the UE was previously served by Cell A. In this case, if Cell B was not already prepared for handover, Cell B sends a context fetch request message back to Cell A. At a minimum, the context fetch request message contains the C-RNTI of the UE making the RRC Connection Reestablishment Request so that Cell A can identify the UE for which to send the context back to Cell B. Provided that Cell A has not released the context of the UE (context release occurs after a configurable amount of time), Cell A sends the context of the UE back to Cell B, thereby allowing the RRC Connection Reestablishment procedure to complete.

In some scenarios, the RRC Connection Reestablishment procedure can fail. For example, the RRC Connection Reestablishment procedure may fail if the UE takes too long to access Cell B such that the context of the UE at Cell A is dropped before Cell B has had a chance to fetch the context of the UE from Cell A. Typically, the context of the UE is held for a number of seconds (i.e., long enough for a sizeable fraction of reestablishments to be successful) but not so long as to tie up resources for serving other users.

RRC Connection Reestablishment failure is not catastrophic. The RRC protocol is able to handle such failures. In particular, if failure occurs, the UE initiates a new service request. However, this carries a cost in terms of signaling (e.g., S1 Application Protocol (S1AP) Context Release, Evolved Packet System (EPS) Bearer Update, RRC Connection Setup, etc.), and a longer service interruption time. In the case of Voice over Long Term Evolution (VoLTE) calls, it can lead to call drops. Thus, while the system (i.e., the EPS for LTE) is able to handle the failure of reestablishments, clearly, it is desirable to minimize the number of such failures in order to maintain good radio network performance. As such, there is a need for systems and methods that provide improved success rates for RRC Connection Reestablishments.

SUMMARY

Systems and methods that provide improved success rates for connection reestablishments in a cellular communications system are disclosed. Embodiments of a radio access node in a cellular communications system enabling connection reestablishment for a wireless device to a target cell controlled by the radio access node are disclosed. In some embodiments, the radio access node comprises a network interface configured to enable communication between the radio access node and one or more other radio access nodes, at least one processor, and memory containing instructions executable by the at least one processor whereby the radio access node is operative to: (a) perform, via the network interface, a wireless device context fetch for a context for the wireless device from two or more candidate source cells of the wireless device in response to a connection reestablishment request from the wireless device and (b) receive a wireless device context from at least one of the two or more candidate source cells of the wireless device in response to performing the wireless device context fetch. By performing multiple context fetches, the radio access node mitigates the problem of Physical Cell Identifier (PCI) ambiguity.

In some embodiments, the radio access node is further operative to complete connection reestablishment with the wireless device to the target cell based on the wireless device context received from one of the at least one of the two or more candidate source cells.

In some embodiments, a cause of the connection reestablishment request is a Radio Link Failure (RLF) for the wireless device while the wireless device is being served by a source cell.

In some embodiments, the two or more candidate source cells for the wireless device are neighboring cells of the target cell having the same cell identifier as a source cell of the wireless device. Further, in some embodiments, the cellular communications system comprises multiple cells for each of at least two carrier frequencies where at least some of the cells for the at least two carrier frequencies are assigned the same cell identifiers and the two or more candidate source cells for the wireless device comprise at least two cells on different carrier frequencies.

In some embodiments, the radio access node further comprises at least one transmitter and at least one receiver configured to enable wireless communication between the radio access node and the wireless device, and the radio access node is further operative to: (a) receive the connection reestablishment request from the wireless device via the at least one receiver and (b) identify the two or more candidate source cells for the wireless device having cell identifiers that match a cell identifier of a source cell of the wireless device based on the connection reestablishment request. Further, in some embodiments, the connection reestablishment request is a request to reestablish a connection of the wireless device with the target cell controlled by the radio access node in response to an RLF of the wireless device in the source cell of the wireless device.

In some embodiments, the cell identifier of the source cell of the wireless device is comprised in the connection reestablishment request received from the wireless device.

In some embodiments, in order to perform the wireless device context fetch for the context for the wireless device from the two or more candidate source cells of the wireless device, the radio access node is further operative to, for each candidate source cell of the two or more candidate source cells identified for the wireless device, request a wireless device context for the wireless device for the candidate source cell from a radio access node controlling the candidate source cell.

In some embodiments, the radio access node is further operative to, in order to receive the wireless device context from at least one of the two or more candidate source cells of the wireless device, receive the wireless device context from the radio access node for only one of the two or more candidate source cells such that the wireless device context received from the radio access node is utilized as the wireless device context of the wireless device.

In some embodiments, the radio access node is further operative to, in order to receive the wireless device context from at least one of the two or more candidate source cells of the wireless device, receive a wireless device context and a health indicator from the radio access node for each of at least two of the two or more candidate source cells. For each candidate source cell of the at least two of the two or more candidate source cells, the health indicator is an indicator of a heath of a connection between the candidate source cell and a matching wireless device having an identifier for the candidate source cell that matches that of the wireless device from which the connection reestablishment request was received. Further, in some embodiments, the radio access node is further operative to select one of the contexts received from the radio access nodes of the at least two of the two or more candidate source cells as the context for the wireless device based on the health indicators.

In some embodiments, the radio access node further comprises at least one transmitter and at least one receiver configured to enable wireless communication between the radio access node and the wireless device, and the radio access node is further operative to: (a) receive the connection reestablishment request from the wireless device via the at least one receiver, (b) identify a plurality of candidate source cells for the wireless device having cell identifiers that match a cell identifier of a source cell of the wireless device based on the connection reestablishment request, and (c) restrict the plurality of candidate source cells based on one or more predefined criteria to thereby identify the two or more candidate source cells for which to perform a context fetch.

In some embodiments, the cellular communications system is a $3^{rd}$ Generation Partnership Project (3GPP) Long Term Evolution (LTE) network.

Embodiments of a method of operation of a radio access node in a cellular communications system to enable connection reestablishment for a wireless device to a target cell controlled by the radio access node are also disclosed. In some embodiments, the method of operation of the radio access node comprises: (a) performing a wireless device context fetch for a context for the wireless device from two or more candidate source cells of the wireless device in response to a connection reestablishment request from the wireless device and (b) receiving a wireless device context from at least one of the two or more candidate source cells of the wireless device in response to performing the wireless device context fetch.

Embodiments of a radio access node controlling a candidate source cell for a wireless device in a cellular communications system enabling connection reestablishment for the wireless device to a target cell controlled by a target radio access node are also disclosed. In some embodiments, the radio access node comprises a network interface configured to enable communication between the radio access node and the target radio access node, at least one processor, and memory containing instructions executable by the at least one processor whereby the radio access node is operative to: (a) receive, via the network interface, a context fetch request from the target radio access node comprising an identifier of the wireless device, (b) determine whether there is a matching wireless device for the candidate source cell controlled by the radio access node where the matching wireless device is a wireless device having an identifier for the candidate source cell that matches the identifier of the wireless device comprised in the context fetch request, and (c) if there is a matching wireless device, determine a health of a connection between the matching wireless device and the candidate source cell.

In some embodiments, the radio access node is further operative to determine the health of the connection between the matching wireless device and the candidate source cell based on a predefined number of Radio Link Control (RLC) retransmissions that have been sent from the candidate source cell to the matching wireless device, whether there is an ongoing handover for the matching wireless device, whether a scheduling request or Channel Quality Information (CQI) report has been received by the candidate source cell from the matching wireless device within a predefined amount of time, whether Hybrid Automatic Repeat Request (HARQ) Acknowledgements (ACKs) or Negative Acknowledgements (NACKs) have been received by the candidate source cell from the matching wireless device within a predefined amount of time, and/or whether the candidate source cell has successfully received radio bearer data or signaling radio bearer data from the matching wireless device within a predefined amount of time.

In some embodiments, the radio access node is further operative to, if there is a matching wireless device: (a) return a context for the matching wireless device to the target radio access node as a context for the wireless device if the connection between the matching wireless device and the candidate source cell is determined to be unhealthy and (b) reject the context fetch request if the connection between the matching wireless device and the candidate source cell is determined to be healthy.

In some embodiments, the radio access node is further operative to, if there is a matching wireless device, return, to the target radio access node, a context for the matching wireless device as a candidate context for the wireless device and a health indicator that is indicative of the health of the connection between the matching wireless device and the candidate source cell as determined by the radio access node.

In some embodiments, a cause of the context fetch request is a connection reestablishment request received by the target radio access node due to an RLF for the wireless device while the wireless device is being controlled by a source cell.

In some embodiments, the candidate source cell is a neighboring cell of the target cell and has the same cell identifier as a source cell of the wireless device. Further, in some embodiments, the cellular communications system comprises multiple cells for each of at least two carrier frequencies where at least some of the cells for the at least two carrier frequencies are assigned the same cell identifiers and the candidate source cell for the wireless device is one of multiple candidate source cells for the wireless device comprising at least two cells on different carrier frequencies.

In some embodiments, the cellular communications system is a 3GPP LTE network.

Embodiments of a method of operation of a radio access node controlling a candidate source cell for a wireless device in a cellular communications system to enable connection reestablishment for the wireless device to a target cell controlled by a target radio access node are also disclosed. In some embodiments, the method of operation of the radio access node comprises: (a) receiving a context fetch request from the target radio access node comprising an identifier of the wireless device, (b) determining whether there is a matching wireless device for the candidate source cell controlled by the radio access node where the matching wireless device is a wireless device having an identifier for the candidate source cell that matches the identifier of the wireless device comprised in the context fetch request, and (c) if there is a matching wireless device, determining a health of a connection between the matching wireless device and the candidate source cell.

In some embodiments, the method further comprises, if there is a matching wireless device, returning a context of the matching wireless device to the target radio access node as a context for the wireless device if the connection between the matching wireless device and the candidate source cell is determined to be unhealthy and rejecting the context fetch request if the connection between the matching wireless device and the candidate source cell is determined to be healthy.

In some embodiments, the method further comprises, if there is a matching wireless device, returning, to the target radio access node, a context of the matching wireless device as a candidate context for the wireless device and a health indicator that is indicative of the health of the connection between the matching wireless device and the candidate source cell as determined by the radio access node.

Embodiments of radio access node in a cellular communications system enabling connection reestablishment for a wireless device to a target cell controlled by the radio access node based on carrier frequency information are also disclosed. In some embodiments, the radio access nodes comprises at least one transmitter and at least one receiver configured to enable wireless communication between the radio access node and the wireless device, a network interface configured to enable communication between the radio access node and one or more other radio access nodes, at least one processor, and memory containing instructions executable by the at least one processor whereby the radio access node is operative to: (a) receive a connection reestablishment request from the wireless device via the at least one receiver, (b) identify a candidate source cell for the wireless device having a cell identifier that matches a cell identifier of a source cell of the wireless device and a carrier frequency that matches a carrier frequency of the source cell of the wireless device based on the connection reestablishment request, (c) send, via the network interface, a context fetch request for a context for the wireless device to a candidate source radio access node controlling the candidate source cell identified for the wireless device, and (d) receive, via the network interface, the context for the wireless device from the candidate source radio access node in response to the context fetch request.

Further, in some embodiments, the radio access node is further operative to complete connection reestablishment with the wireless device to the target cell based on the context for the wireless device received from the candidate source radio access node.

In some embodiments, a cause of the connection reestablishment request is an RLF for the wireless device while the wireless device is being served by the source cell.

In some embodiments, the candidate source cell for the wireless device is one of two or more neighboring cells of the target cell having the same cell identifier as the source cell of the wireless device. Further, in some embodiments, the cellular communications system comprises multiple cells for each of at least two carrier frequencies where at least some of the cells for the at least two carrier frequencies are assigned the same cell identifiers.

In some embodiments, the connection reestablishment request comprises an indication of a carrier frequency of a source cell of the wireless device. Further, in some embodiments, the indication of the carrier frequency of the source cell of the wireless device is one or more bit values that are mapped to a predefined carrier frequency. In other embodiments, the indication of the carrier frequency of the source cell of the wireless device is an absolute priority of the carrier frequency of the source cell of the wireless device, where different carrier frequencies are assigned different absolute priorities.

In some embodiments, the cellular communications system is a 3GPP LTE network.

Embodiments of a method of operation of a radio access node in a cellular communications system to enable connection reestablishment for a wireless device to a target cell controlled by the radio access node based on carrier frequency information are also disclosed. In some embodiments, the method of operation of the radio access nodes comprises: (a) receiving a connection reestablishment request from the wireless device, (b) identifying a candidate source cell for the wireless device having a cell identifier that matches a cell identifier of a source cell of the wireless device and a carrier frequency that matches a carrier frequency of the source cell of the wireless device based on the connection reestablishment request, (c) sending a context fetch request for a context for a wireless device to a candidate source radio access node controlling the candidate source cell identified for the wireless device, and (d) receiving the context for the wireless device from the candidate source radio access node in response to the context fetch request.

Embodiments of a wireless device in a cellular communications system enabling connection reestablishment for the wireless device to a target cell controlled by a target radio access node are also disclosed. In some embodiments, the wireless device comprises at least one transmitter and at least one receiver configured to enable wireless communication between the wireless device and the target radio access node, at least one processor, and memory containing instructions executable by the at least one processor whereby the wireless device is operative to: (a) transmit a connection reestablishment request to the target radio access node via the at least one transmitter, the connection reestablishment request comprising an indication of a carrier frequency of a source cell of the wireless device, and (b) in response, receive a connection reestablishment message from the target radio access node via the at least one receiver.

In some embodiments, the wireless device is further operative to detect an RLF for the wireless device with respect to the source cell of the wireless device, select the target cell, and transmit the connection reestablishment request to the target radio access node in response to detecting the RLF and selecting the target cell.

In some embodiments, the indication of the carrier frequency of the source cell of the wireless device is one or more bit values that are mapped to a predefined carrier frequency.

In some embodiments, the indication of the carrier frequency of the source cell of the wireless device is an absolute priority of the carrier frequency of the source cell of the wireless device, where different carrier frequencies are assigned different absolute priorities.

In some embodiments, the cellular communications system is a 3GPP LTE network.

Embodiments of a method of operation of a wireless device in a cellular communications system to enable connection reestablishment for the wireless device to a target cell controlled by a target radio access node are also disclosed. In some embodiments, the method of operation of the wireless device comprises transmitting a connection reestablishment request to the target radio access node, the connection reestablishment request comprising an indication of a carrier frequency of a source cell of the wireless device, and, in response, receiving a connection reestablishment message from the target radio access node.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 14 is a block diagram of a base station according to some embodiments of the present disclosure;

FIG. 15 is a block diagram of a base station according to some other embodiments of the present disclosure; and FIG. 16 is a block diagram of a base station according to some other embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods that provide improved success rates for connection reestablishments in a cellular communications system are disclosed. However, before describing embodiments of the present disclosure, a discussion of some situations in which Radio Resource Control (RRC) Connection Reestablishment failures may occur is beneficial. Notably, while the description herein focuses on 3$^{rd}$ Generation Partnership Project (3GPP) Long Term Evolution (LTE) and LTE terminology is oftentimes used, the concepts disclosed herein are equally applicable to other packet data communications systems (e.g., Universal Mobile Telecommunications System (UMTS) or other packet-oriented wireless system).

Figure 2:
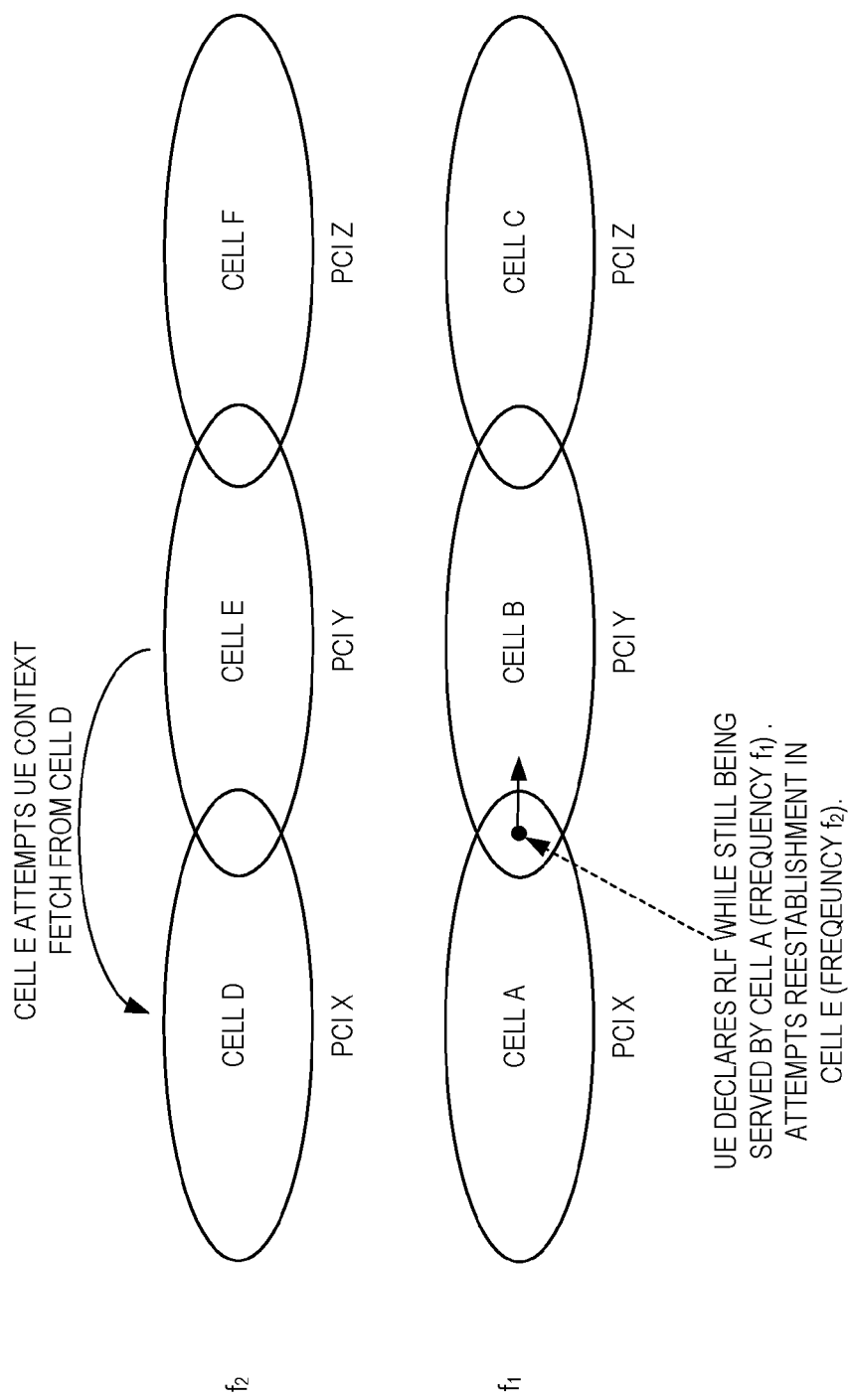
FIG. 2 illustrates one example of an RRC Connection Reestablishment for a UE that declares an RLF in a multi-band scenario that may result in ambiguity regarding the source cell of the UE when desiring to obtain the context of the UE for the RRC Connection Reestablishment procedure.

FIG. 2 illustrates a multi-band scenario that may result in ambiguity regarding the source cell of a User Equipment device (UE) when the target cell attempts to obtain the context of the UE for the RRC Connection Reestablishment procedure. In particular, in this example, there are two frequency bands having carrier frequencies $f_1$ and $f_2$. Cells A, B, and C are on the first carrier frequency $f_1$, and Cells D, E, and F are on the second carrier frequency $f_2$. In this example, cells A, B, and C cover the same geographic areas as Cells D, E, and F, respectively. Since Physical Cell Identifier (PCI) planning is a time consuming task in any network, an often-used expedient is to reuse a PCI plan across multiple frequency bands. As such, in this example, Cells A, B, and C on the first carrier frequency $f_1$ use the same Pas as Cells D, E, and F, respectively, on the second carrier frequency $f_2$.

Figure 1:
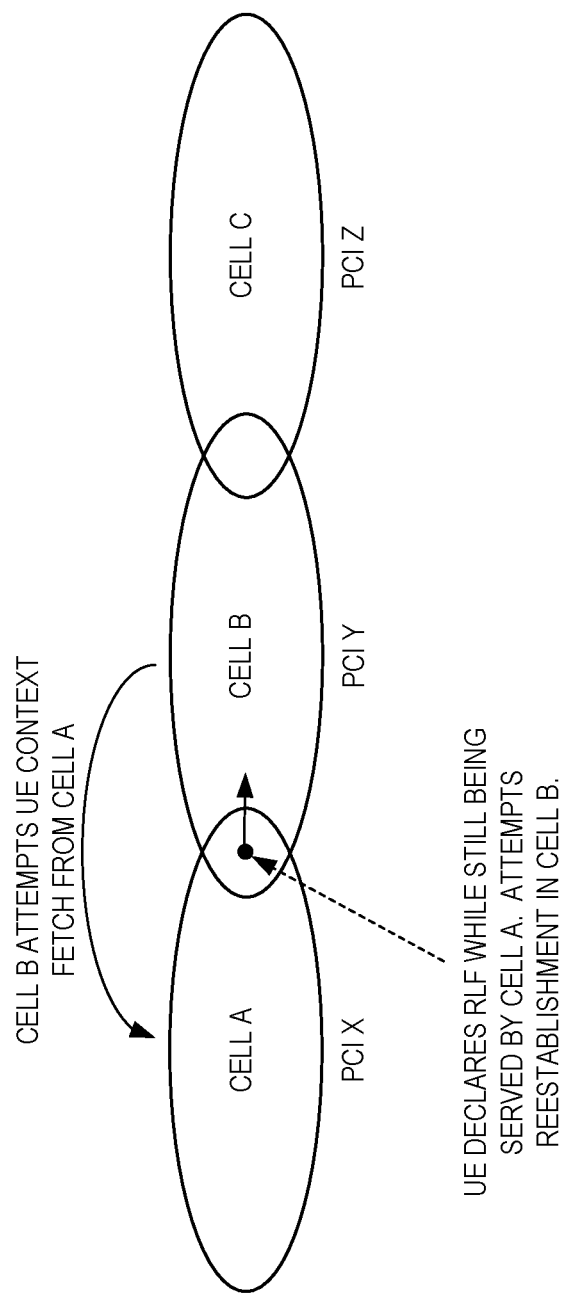
FIG. 1 illustrates one example of a Radio Resource Control (RRC) Connection Reestablishment for a User Equipment (UE) that declares a Radio Link Failure (RLF) in a single-band scenario.

As discussed above with respect to FIG. 1, the UE declares a Radio Link Failure (RLF) while still being served by Cell A. In this scenario, however, it is assumed that the UE subsequently reselects a cell on a different carrier frequency, which in this example is Cell E on carrier frequency $f_2$. After executing a random access procedure to Cell E, the UE sends an RRC Connection Reestablishment Request message to Cell E, which is the target cell. As before, the RRC Connection Reestablishment Request message indicates PCI X (i.e., the PCI of the source cell, which in this example is Cell A) as well as the Cell Radio Network Temporary Identifier (C-RNTI) assigned to the UE when it was being served by Cell A (i.e., the source cell). The difference between this scenario and the scenario of FIG. 1 is that, from Cell E's perspective, there is an ambiguity regarding the source cell. In particular, assuming that both Cell A and Cell D are in the neighbor list, there is a PCI confusion problem because both Cell A and Cell D have the same PCI (PCI X). As such, Cell E does not know which of Cell A and Cell D is the source cell and, therefore, does not know whether to fetch the context of the UE from Cell A or from Cell D. The UE does not signal enough information to resolve the ambiguity. Faced with this confusion, Cell E typically makes a choice between sending the context fetch request to Cell A or to Cell D. A reasonable strategy is to choose the cell on the same frequency as itself (Cell E), which in this case is Cell D on carrier frequency $f_2$.

Clearly, this strategy has a high probability of failure in the multi-carrier scenario when the UE may reselect cells on different frequencies. In this example where the context fetch is requested from Cell D, one of two problematic outcomes occurs. If the C-RNTI in the context fetch request message is not currently being used by any UE in Cell D, then Cell D rejects the incoming context fetch request. In contrast, if the C-RNTI is being used by a UE in Cell D, then that UEs context will be sent back to Cell E; however, the context corresponds to the wrong UE. In both cases, the RRC Connection Reestablishment procedure fails, and the UE needs to initiate a new service request. This is an undesirable outcome from a signaling and service interruption time point of view.

Figure 3:
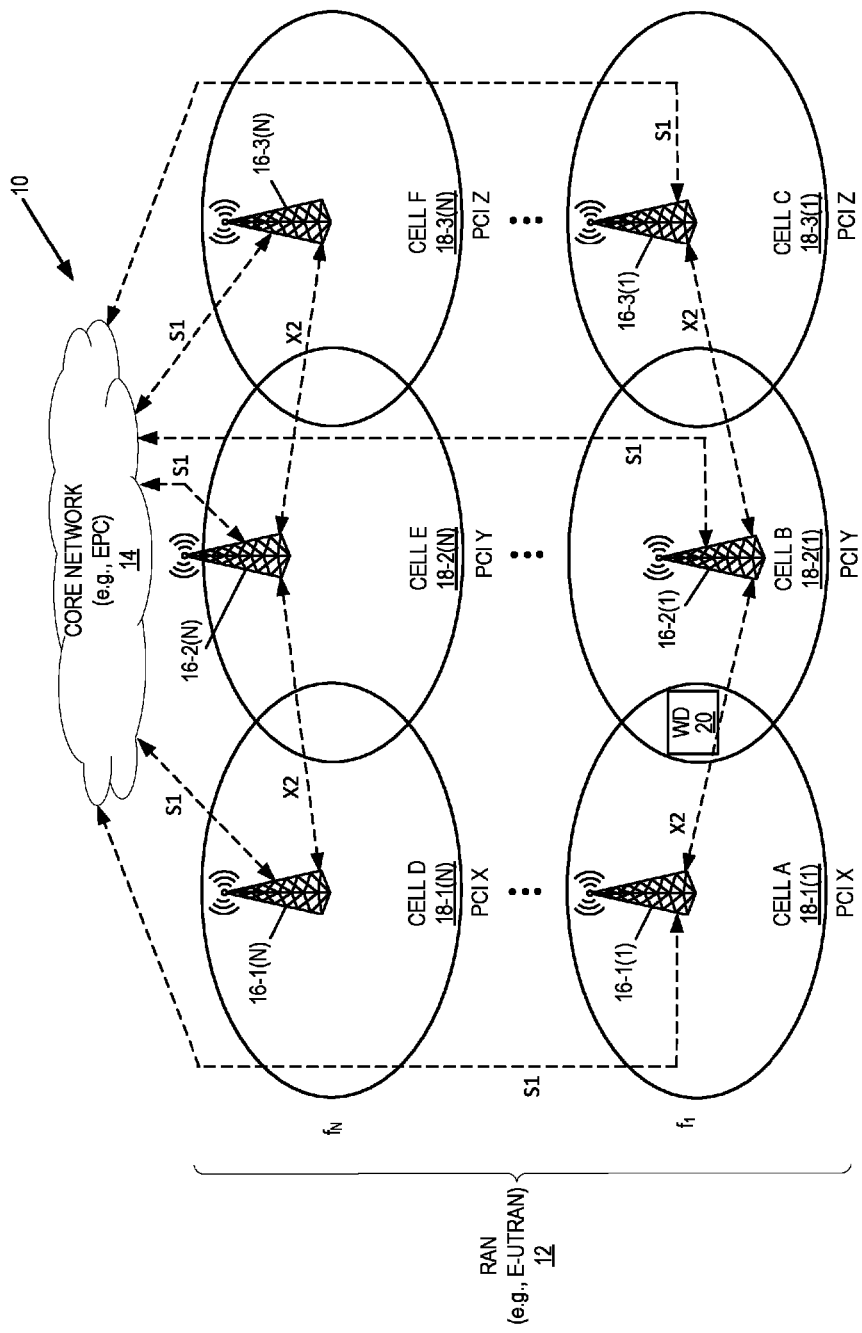
FIG. 3 illustrates a cellular communications system that enables improved success rates for connection reestablishments according to some embodiments of the present disclosure.

Systems and methods that provide improved success rates for connection reestablishments in a cellular communications system are disclosed. In this regard, FIG. 3 illustrates a cellular communications system 10 that enables improved success rates for connection reestablishments according to some embodiments of the present disclosure. As illustrated, the cellular communications system 10 includes a Radio Access Network (RAN) 12 and a core network 14. The discussion here focuses on embodiments in which the cellular communications system 10 is a 3GPP LTE cellular communications system, where the RAN 12 is an Evolved Universal Terrestrial RAN (E-UTRAN) and the core network 14 is an Evolved Packet Core (EPC) and the E-UTRAN and the EPC together form an Evolved Packet System (EPS). As such, 3GPP LTE terminology is oftentimes used in this disclosure. However, the concepts disclosed herein are not limited to 3GPP LTE and may be used in any suitable packet-data oriented type of wireless communications system (e.g., Universal Mobile Telecommunications System (UMTS) or other packet-oriented wireless system). Therefore, more general terminology is sometimes used. Notably, as used herein, a "network node" is any node in either the RAN 12 or the core network 14, a "core network node" is any node in the core network 14, a "radio access node" is any node in the RAN 12, a node in the cellular communications system 10 is any network node or a wireless device, and a "wireless device" is any mobile or stationary device or terminal that accesses the cellular communications system 10 via the RAN 12 (e.g., a UE).

As illustrated, the RAN 12 includes base stations 16-1(1) through 16-3(1) (e.g., enhanced or evolved Node Bs (eNBs)) operating on a first carrier frequency $f_1$ (or in a first frequency band). Likewise, the RAN 12 includes base stations 16-1(N) through 16-3(N) operating on a carrier frequency $f_N$. The base stations 16-1(1) through 16-3(N) are more generally referred to herein collectively as base stations 16 and individually as base station 16. Note that there may be any number of two or more carrier frequencies, each with a corresponding set of base stations 16. While three base stations 16 for each carrier frequency are illustrated for simplicity and ease of discussion, the RAN 12 may include any number of base stations 16 for each carrier frequency. Further, the number of base stations 16 for each carrier frequency may be different. Still further, while separate base stations 16 are illustrated for each carrier frequency, some or all of the base stations 16 may operate on multiple carrier frequencies. Also, while base stations 16 are discussed herein, the concepts disclosed herein are applicable to other types of radio network nodes (e.g., Remote Radio Heads (RRHs), Radio Network Controllers (RNCs), etc.). It should also be noted that while the multi-carrier scenario is described herein, the concepts disclosed herein are also applicable to a single-carrier scenario.

The base stations 16-1(1) through 16-1(N) serve, or control, multiple cells 18-1(1) through 18-1(N) on different carrier frequencies $f_1$ through $f_N$ (i.e., each of the cells 18-1(1) through 18-1(N) operate in different frequency bands). The cells 18-1(1) through 18-1(N) are generally referred to herein as collectively cells 18-1 and individually as cell 18-1. Further, the cells 18-1(1) through 18-1(N) cover the same or at least partially overlapping geographic areas. Likewise, the base stations 16-2(1) through 16-2(N) serve, or control, multiple cells 18-2(1) through 18-2(N) on different carrier frequencies $f_1$ through $f_N$ (i.e., each of the cells 18-2(1) through 18-2(N) operate in different frequency bands). The cells 18-2(1) through 18-2(N) are generally referred to herein as collectively cells 18-2 and individually as cell 18-2. Further, the cells 18-2(1) through 18-2(N) cover the same or at least partially overlapping geographic areas. In the same manner, the base stations 16-3(1) through 16-3(N) serve, or control, multiple cells 18-3(1) through 18-3(N) on different carrier frequencies $f_1$ through $f_N$ (i.e., each of the cells 18-3(1) through 18-3(N) operate in different frequency bands). The cells 18-3(1) through 18-3(N) are generally referred to herein as collectively cells 18-3 and individually as cell 18-3. Further, the cells 18-3(1) through 18-3(N) cover the same or at least partially overlapping geographic areas. Notably, the cells 18-1, 18-2, and 18-3 are generally referred to herein collectively as cells 18 and individually as cell 18. The base stations 16 are connected to at least some of the other base stations 16 via corresponding X2 connections. Note that, while not illustrated for clarity, X2 connections may exist between base stations 16 on different carrier frequencies.

The base stations 16 provides radio access, or wireless services, to wireless devices, such as a wireless device 20, located within the cells 18 served by the base stations 16. The wireless device 20 may be any type of mobile or stationary device enabled to communicate with the RAN 12. In 3GPP LTE terminology, the wireless device 20 may be referred to as a UE.

The core network 14 includes various core network nodes. For example, the core network 14 may include one or more Mobile Management Entities (MMEs), one or more Serving Gateways (S-GWs), one or more Packet Data Network Gateways (P-GWs), etc.

Multiple embodiments of an improved RRC Connection Reestablishment procedure that mitigates the PCI ambiguity problem described above are disclosed. Notably, as used herein, a "target cell" is the cell 18 that is the target of an RRC Connection Reestablishment request from the wireless device 20. Conversely, a "source cell" is the cell 18 serving the wireless device 20 prior to the RRC Connection Reestablishment request. Similarly, as used herein, a "target base station" or "target radio access node" is the base station 16/radio access node controlling the target cell 18 for the RRC Connection Reestablishment request from the wireless device 20, and a "source base station" or "source radio access node" is the base station 16/radio access node controlling the source cell 18 of the wireless device 20 that issued the RRC Connection Reestablishment request to the target cell 18.

As discussed in detail below, in some embodiments, the base station 16 (or more generally radio access node) serving a target cell 18 for an RRC Connection Reestablishment request from the wireless device 20 performs a context fetch for the context of the wireless device 20 from multiple cells 18 instead of just one cell 18. In particular, the base station 16 serving the target cell 18 performs a context fetch for the context of the wireless device 20 from multiple cells 18 in a neighbor list of the target cell 18 having cell identifiers (e.g., PCIs) that match that of a source cell 18 of the wireless device 20. The cells 18 having cell identifiers that match that of the source cell 18 of the wireless device 20 are referred to herein as "candidate source cells." In other words, a "candidate source cell" is a cell 18 that is viewed by the target base station 16 as potentially being the source cell 18 of the wireless device 20. One of the candidate source cells 18 is the source cell 18 of the wireless device 20; however, due to PCI ambiguity, the target base station 16 does not know which of the candidate source cells 18 is the source cell 18 of the wireless device 20. By performing multiple content fetches, the target base station 16 improves the chance of receiving the correct context of the wireless device 20.

In some embodiments, when performing the context fetch for the multiple candidate source cells 18, the target base station 16 receives a context for the wireless device 20 from only the candidate source cell(s) 18 having a context for a matching wireless device 20 (e.g., a wireless device 20 having the same C-RNTI) and having an "unhealthy" connection to the candidate source cell 18. In other words, the base station 16 serving each candidate source cell 18 performs a health check for a connection between the matching wireless device 20 and the corresponding candidate source cell 18. If (and in some embodiments only if) the connection is determined to be unhealthy (indicating a likely RLF), the base station 16 then returns the context of the matching wireless device 20 to the target base station 16 as the context of the wireless device 20 that requested RRC Connection Reestablishment. The base stations 16 having matching wireless devices 20 with healthy connections reject the context fetch request. In this manner, the probability of the correct context for the wireless device 20 being returned to the target base station 16 is improved (e.g., maximized), which in turn improves a success rate of the RRC Connection Reestablishment procedure.

In other embodiments, the target base station 16 receives wireless device 20/UE contexts and health indicators for all of the candidate source cells 18 having a context for a matching wireless device 20, and selects one of the received contexts as the context of the wireless device 20 based on the health indicators (e.g., select the context for one of the matching wireless devices 20 having an unhealthy or most unhealthy connection to the corresponding candidate source cell 18). Again, in this manner, the probability of the correct context for the wireless device 20 being returned and used by the target base station 16 is improved (e.g., maximized), which in turn improves a success rate of the RRC Connection Reestablishment procedure.

Notably, as used herein, a health indicator is indicative of the "health" of the connection between a wireless device 20 and a corresponding cell 18. As used herein, the "health" of a connection between a wireless device 20 and a cell 18 is an overall condition of the connection in terms of the ability of the wireless device 20 and the cell 18 to be able to successfully transmit and receive information to one another. As such, as used herein, a "healthy" connection is a connection determined to be in a good condition (e.g., better than some predefined threshold or satisfying one or more predefined criteria for a good or healthy connection). Likewise, as used herein, an "unhealthy" connection is a connection determined to be in a poor condition (e.g., worse than some predefined threshold or satisfying one or more predefined criteria for a poor or unhealthy connection). Of course, in some embodiments, a connection may be classified as either healthy or unhealthy depending on whether the connection does or does not satisfy the same threshold or the same predefined criteria.

In other embodiments, the wireless device 20 sending the RRC Connection Reestablishment Request further provides an indication of a carrier frequency of the source cell 18 of the wireless device 20. In some embodiments, this indication of the carrier frequency of the source cell 18 is included in the RRC Connection Reestablishment Request message sent from the wireless device 20 to the target base station 16. For example, the indication of the carrier frequency may be included in the RRC Connection Reestablishment Request message as a new Information Element (IE). The indication of the carrier frequency of the source cell 18 is then used by the target base station 16 to help resolve any PCI ambiguity, i.e., help the target base station 16 select one cell 18 from the neighbor list of the target cell 18 that is mostly likely to be the source cell 18 in which the RLF was declared by the wireless device 20. Again, in this manner, the probability of the correct context for the wireless device 20 being obtained and used by the target base station 16 is improved (e.g., maximized), which in turn improves a success rate of the RRC Connection Reestablishment procedure.

FIGS. 4 through 9 relate to embodiments in which the target base station 16 performs a context fetch for the context of the wireless device 20 from potentially multiple candidate source cells 18. These embodiments may be implemented on the base stations 16 in, e.g., a proprietary manner (i.e., in a manner that does not impact standards such as the 3GPP standards). Notably, while these embodiments are described with respect to the multi-carrier scenario, these embodiments are also applicable to the single-band scenario or in any scenario(s) in which there is PCI confusion (i.e., two or more neighbor list entries with the same PCI).

Figure 4:
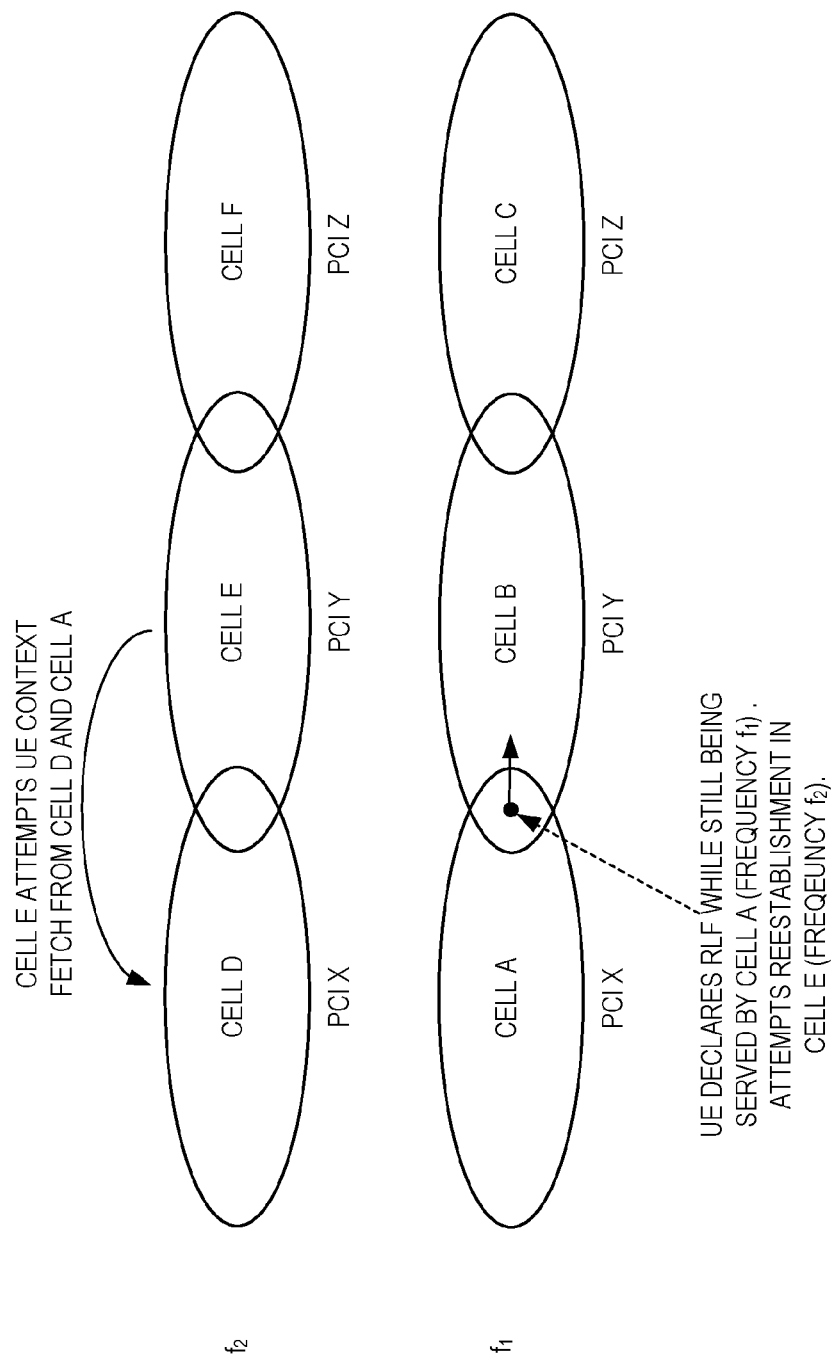
FIG. 4 illustrates one example of an RRC Connection Reestablishment procedure in which the target base station performs a context fetch from multiple candidate source cells according to some embodiments of the present disclosure.

FIG. 4 illustrates one example of an RRC Connection Reestablishment procedure in which the target base station 16 performs a context fetch from multiple candidate source cells 18 according to some embodiments of the present disclosure. In this example, the cells 18-1(1), 18-2(1), 18-3 (1), 18-1(N), 18-2(N), and 18-3(N) are referred to as Cells A, B, C, D, E, and F, respectively. As illustrated, the wireless device 20 is on the edge of Cell A moving toward Cell B. Before a handover is initiated, or before handover is completed successfully, the wireless device 20 declares an RLF while still being served by Cell A. Upon RLF declaration, the wireless device 20 initiates a cell search, and in this example, the wireless device 20 reselects Cell E since, in this example, the wireless device 20 measures better signal strength/quality for Cell E as compared to Cells A, B, and D. The wireless device 20 then attempts an RRC Connection Reestablishment to Cell E by sending an RRC Connection Reestablishment Request message to the target base station 16 (i.e., the base station 16 controlling the target cell 18, which in this case is Cell E). The RRC Connection Reestablishment message includes the PCI of Cell A (i.e., the PCI of the source cell 18) and the C-RNTI assigned to the wireless device 20 by Cell A.

In this example, Cell A (i.e., the source cell 18) has a PCI of X. Since both Cell A and Cell D have the same PCI (PCI X) and assuming that both Cell A and Cell D are in the neighbor list of Cell E, the target base station 16 identifies both Cell A and Cell D as candidate source cells 18 for the wireless device 20. The target base station 16 then performs a context fetch for the wireless device 20 from both Cell A and Cell D. The context fetch request includes the C-RNTI assigned to the wireless device 20 by the source cell 18. As discussed below, the base station 16 controlling Cell A performs a health check for the connection between Cell A and a matching wireless device 20 in Cell A (if any). Likewise, the base station 16 controlling Cell D performs a health check for the connection between Cell D and a matching wireless device 20 in Cell D (if any). Using the health of the connections, the appropriate context is returned and used by the target base station 16 to complete the RRC Connection Reestablishment procedure. Note that FIG. 4 is only one example. Other embodiments and variations of the improved RRC Connection Reestablishment procedure are described below.

Figure 5:
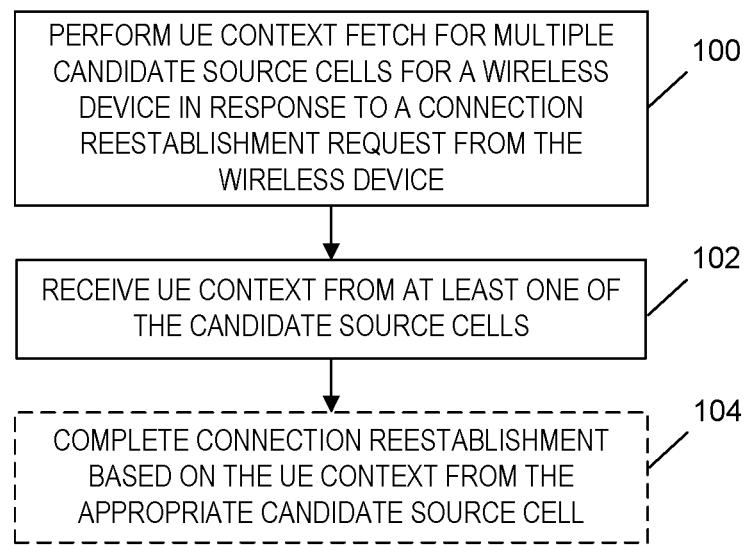
FIG. 5 is a flow chart that illustrates the operation of the target base station to enable improved RRC Connection Reestablishment according to some embodiments of the present disclosure.

FIG. 5 is a flow chart that illustrates the operation of the target base station 16 to enable improved RRC Connection Reestablishment according to some embodiments of the present disclosure. Note that while this process is described as being performed by the target base station 16, this process may be more generally performed by any suitable radio access node. As illustrated, the target base station 16 performs a context fetch (sometimes referred to herein as a UE context fetch) for a context of a wireless device 20 from multiple (i.e., two or more) candidate source cells 18 of the wireless device 20 in response to a connection reestablishment request (e.g., an RRC Connection Reestablishment Request) from the wireless device 20 (step 100). More specifically, as discussed below, the candidate source cells 18 are cells 18 in the neighbor list of the target cell 18 that have the same cell identifier (e.g., PCI) as the source cell 18 of the wireless device 20.

In response, the target base station 16 receives a context of a wireless device 20 from at least one of the candidate source cells 18 (more specifically from the base station(s) 16 serving the at least one of the candidate source cells 18) (step 102). In some embodiments, the target base station 16 then completes the connection reestablishment based on the context from the appropriate candidate source cell 18 (step 104). More specifically, in some embodiments, only the base station 16 controlling the candidate source cell 18 having a matching wireless device 20 (e.g., a wireless device 20 having the same C-RNTI as the wireless device 20 that sent the connection reestablishment request) with a unhealthy, or poor, connection to that candidate source cell 18 (indicative of an RLF) responds with a context of that wireless device 20. This context can then be assumed to be the context of the wireless device 20 that sent the connection reestablishment request and therefore used to complete the connection reestablishment. In other embodiments, the base stations 16 controlling all candidate source cells 18 having matching wireless devices 20 return the corresponding contexts to the target base station 16. The target base station 16 then selects one of the contexts as the context of the wireless device 20 that sent the connection reestablishment request (e.g., selects the context for the matching wireless device 20 having the most unhealthy, or worst, connection to the corresponding candidate source cell 18). The selected context may then be used to complete the connection reestablishment.

Figure 6A:
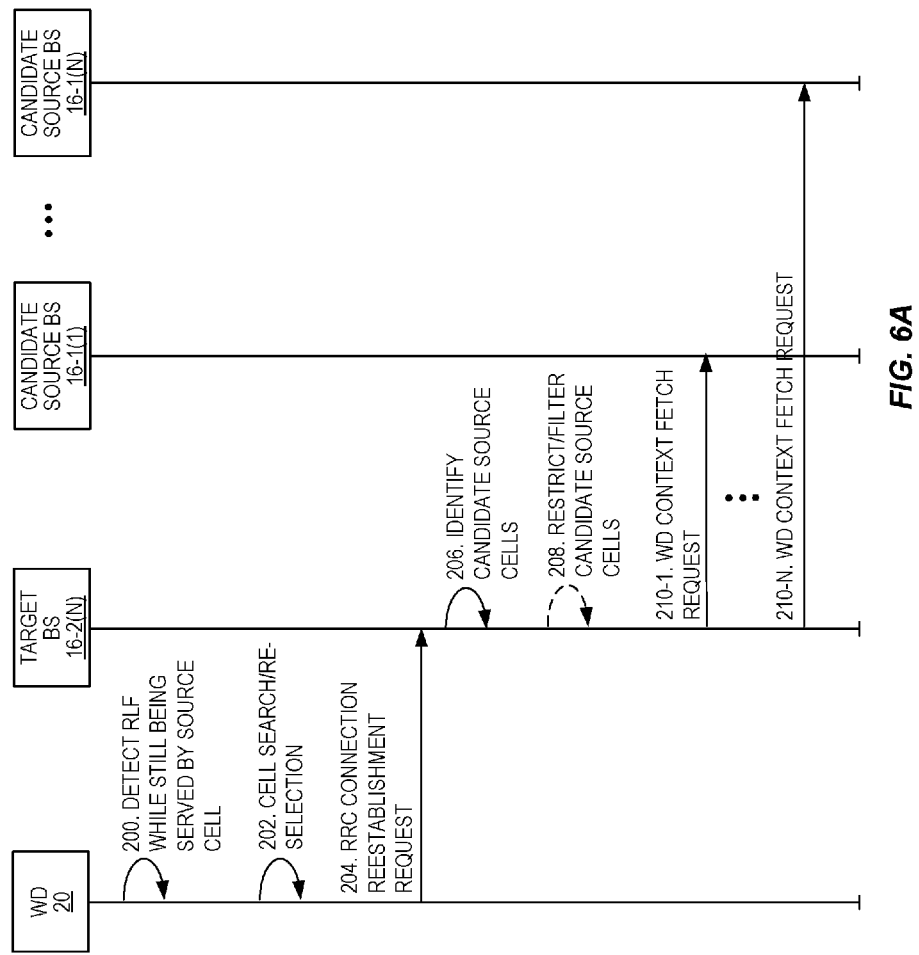
FIGS. 6A and 6B are a more detailed illustration of the connection reestablishment procedure of FIG. 5 according to some embodiments of the present disclosure.
Figure 6B:
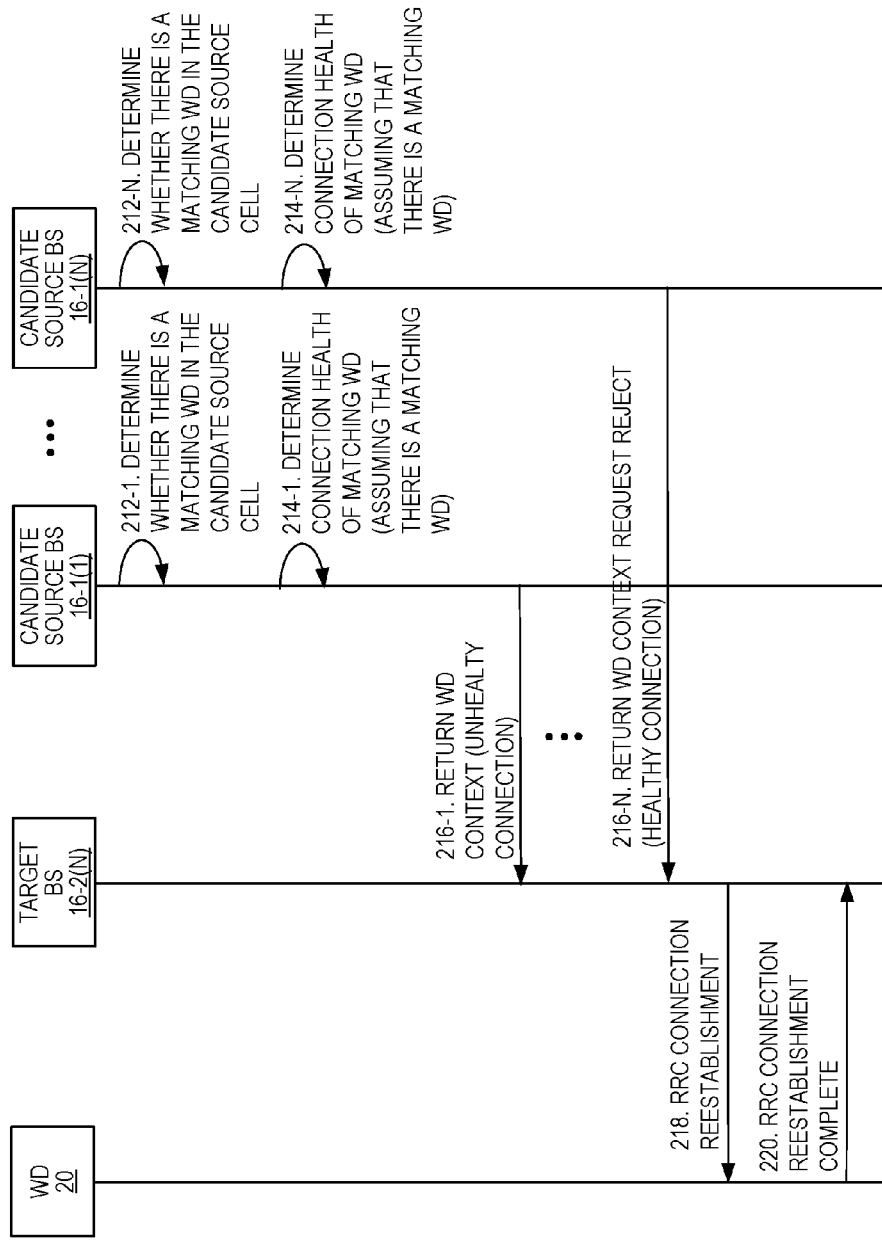

FIGS. 6A and 6B are a more detailed illustration of the connection reestablishment procedure of FIG. 5 according to some embodiments of the present disclosure. As illustrated, while being served by a source cell 18, the wireless device 20 detects, or declares, an RLF (step 200). In response, the wireless device 20 performs a cell search procedure whereby the wireless device 20 (re)selects a target cell 18 controlled by a target base station 16 (step 202). In this example, the target cell 18 is the cell 18-2(N) and, as such, the target base station 16 is the base station 16-2(N). As such, for this example, the cell 18-2(N) is referred to as the target cell 18-2(N), and the base station 16-2(N) is referred to as the target base station 16-2(N). Similarly, in this example, the cell 18-1(1) is the source cell and, as such, is referred to in this example as the source cell 18-1(1).

The wireless device 20 then initiates the RRC Connection Reestablishment procedure by sending an RRC Connection Reestablishment Request message to the target base station 16-2(N) (step 204). In response, the target base station 16-2(N) identifies a number of candidate source cells 18 for the wireless device 20 based on the RRC Connection Reestablishment Request message (step 206). More specifically, as discussed above, the RRC Connection Reestablishment Request message includes the PCI of the source cell 18-1(1) of the wireless device 20 as well as the C-RNTI of the wireless device 20 assigned to the wireless device 20 when being served by the source cell 18-1(1). The candidate source cells 18 are the source cells in a preconfigured neighbor list of the target cell 18-2(N) having Pas that match the PCI of the source cell 18-1(1) of the wireless device 20 included in the RRC Connection Reestablishment message. In this example, the cells 18-1(1) through 18-1(N) are identified as the candidate source cells and, as such in this example, the cells 18-1(1) through 18-1(N) are referred to as the candidate source cells 18-1(1) through 18-1(N), and the base stations 16-1(1) through 16-1(N) are referred to as the candidate source base stations 16-1(1) through 16-1(N).

Optionally, in some embodiments, the target base station 16-2(N) restricts or filters the set, or list, of candidate source cells 18-1(1) through 18-1(N) based on one or more predefined criteria to provide a restricted set, or list, of candidate source cells 18 (step 208). The one or more predefined criteria may include any criteria that can be used to predict which of the candidate source cells 18-1(1) through 18-1(N) is(are) most likely to be the source cell of the wireless device 20. For example, in some embodiments, mobility history information for the candidate source cells 18-1(1) through 18-1(N) is used to identify a subset of the candidate source cells 18-1(1) through 18-1(N) having the worst mobility histories (e.g., largest handover failure rates) as the restricted set of candidate source cells 18. The restricted set may include one, two, or more candidate source cells 18.

Next, the target base station 16-2(N) performs a wireless device 20 (or UE) context fetch for the wireless device 20 from each of the candidate source cells 18-1(1) through 18-1(N) or, alternatively if step 208 is performed, each of the candidate source cells 18 in the restricted set of candidate source cells 18 (e.g., one, two, or more, but typically not all of the candidate source cells 18-1(1) through 18-1(N) identified in step 206). In particular, the target base station 16-2(N) sends a WD context fetch request to the candidate source base stations 16-1(1) through 16-1(N) controlling the candidate source cells 18-1(1) through 18-1(N) (steps 210-1 through 210-N). The WD context fetch requests include an identifier of the wireless device 20, which in this example is the C-RNTI assigned to the wireless device 20 in the source cell 18-1(1) of the wireless device 20.

The candidate source base station 16-1(1) determines whether there is a matching wireless device 20 for the candidate source cell 18-1(1) (step 212-1). Here, a matching wireless device 20 is a wireless device 20 served or previously served by the candidate source cell 18-1(1) that has a C-RNTI assigned by the candidate source cell 18-1(1) that is the same as the C-RNTI of the wireless device 20 that sent the RRC Connection Reestablishment Request message to the target cell 18-2(N). Notably, in the case of RLF, the matching wireless device 20 may be a wireless device 20 that has declared an RLF for the candidate source cell 18-1(1) but for which the candidate source cell 18-1(1) has not yet released the wireless device 20 context.

In this example, there is a matching wireless device 20 in the candidate source cell 18-1(1). As such, the candidate source base station 16-1(1) determines a health of the connection between the matching wireless device 20 and the candidate source cell 18-1(1) (step 214-1). The candidate source base station 16-1(1) may determine the health (or check the health) of the connection using any suitable technique. For example, the candidate source base station 16-1(1) may determine the health of the connection using any one or a combination of the following techniques:

The candidate source base station 16-1(1) checks how many Radio Link Control (RLC) retransmissions have been sent to the matching, or candidate, wireless device 20. If the number of retransmissions exceeds a configurable threshold (e.g., a predefined number), then the connection is deemed "unhealthy."

The candidate source base station 16-1(1) checks if there is an ongoing handover for the matching wireless device 20. If there is, then the connection is deemed "unhealthy."

The candidate source base station 16-1(1) checks if a Scheduling Request (SR) or Channel Quality Information (CQI) report has been recently received from the matching wireless device 20. If no SR or CQI has been received within a configurable time, then the connection is deemed "unhealthy."

The candidate source base station 16-1(1) checks if Hybrid Automatic Repeat Request (HARQ) Acknowledgements (ACKs)/Negative Acknowledgements (NACKs) have been received for the matching wireless device 20 in response to downlink assignments for the matching wireless device 20 within a predefined amount of time. If the number of times no ACK/NACK is received exceeds a configurable threshold within the predefined amount of time, then the connection is deemed "unhealthy."

The candidate source base station 16-1(1) checks if it has successfully received Data Radio Bearer (DRB) or Signaling Radio Bearer (SRB) data from the matching wireless device 20 within a configurable time (e.g., a predefined amount of time). If it has, then the connection is deemed "healthy."

In this example, the connection between the matching wireless device 20 and the candidate source cell 18-1(1) is determined to be unhealthy. As such, it can be assumed that the matching wireless device 20 has declared an RLF and, as such, is likely to be the wireless device 20 that sent the RRC Connection Reestablishment Request message to the target cell 18-2(N). Therefore, the candidate source base station 16-1(1) returns a context of the matching wireless device 20 to the target base station 16-2 (step 216-1). The target base station 16-2(N) can then assume that the context returned by the candidate source base station 16-1(1) is the correct context of the wireless device 20 that sent the RRC Connection Reestablishment Request message.

The other candidate source base stations 16 process the context fetch request in the same manner. Using the candidate source cell 18-1(N) as an example, the candidate source base station 16-1(N) determines whether there is a matching wireless device 20 for the candidate source cell 18-1(N) (step 212-N). In this example, there is a matching wireless device 20 in the candidate source cell 18-1(N). As such, the candidate source base station 16-1(N) determines a health of the connection between the matching wireless device 20 and the candidate source cell 18-1(N) (step 214-N). As discussed above, the candidate source base station 16-1(N) may determine the health (or check the health) of the connection using any suitable technique such as, for example, any one or a combination of the example techniques described above.

In this example, the connection between the matching wireless device 20 in the candidate source cell 18-1(N) and the candidate source cell 18-1(N) is determined to be healthy. As such, it is likely that the matching wireless device 20 is not the wireless device 20 that sent the RRC Connection Reestablishment Request message to the target cell 18-2(N). Therefore, the candidate source base station 16-1(N) rejects the context fetch request (step 216-N).

Thus, for each of the candidate source cells 18 (or alternatively each of the candidate source cells 18 in the restricted set of candidate source cells 18), the candidate source base station 16 controlling that candidate source cell 18 returns the context of the matching wireless device 20 if there is a matching wireless device 20 having an unhealthy connection to the candidate source cell 18. Conversely, if there is either: (a) no matching wireless device 20 for the corresponding candidate source cell 18 or (b) a matching wireless device 20 with a healthy connection to the corresponding candidate source cell 18, then the candidate source base station 16 rejects the context fetch request.

Typically, only one of the candidate source cells 16 will have a matching wireless device 20 with an unhealthy connection to that candidate source cell 16. However, contexts are received from two or more of the candidate source cells 18, then the target base station 16-2(N) selects one of the contexts as the context of the wireless device 20 using any suitable selection technique (e.g., randomly or based on one or more predefined criteria). For example, when selecting one of the contexts, the target base station 16-2(N) may consider predefined side information that indicates (explicitly or implicitly) which of the contexts is most likely to be the correct context for the wireless device 20. This side information may be, for example, mobility history information obtained by the target base station 16-2(N) for the corresponding candidate source cells 18. For example, if there are certain neighbor relations where mobility fails more frequently than others (e.g., a high frequency of RLFs), this information may be used by the target base station 16-2(N) to select the context received from the candidate source cell 18 corresponding to the neighbor relation with the poorest mobility history.

At this point, the target base station 16-2(N) has obtained the context of the wireless device 20 (or at least the context that it can assume is the context of the wireless device 20). As such, the target base station 16-2(N) uses this context to complete the RRC Connection Reestablishment procedure by sending an RRC Connection Reestablishment message to the wireless device 20 (step 218). More specifically, the target base station 16-2(N) sends the RRC Connection Reestablishment message to the wireless device 20 with the assumption that it has obtained the correct context of the wireless device 20. In response, the target base station 16-2(N) receives an RRC Connection Reestablishment Complete message from the wireless device 20 (step 220). The target base station 16-2(N) then uses the context to start receiving/transmitting data to the wireless device 20.

Figure 7:
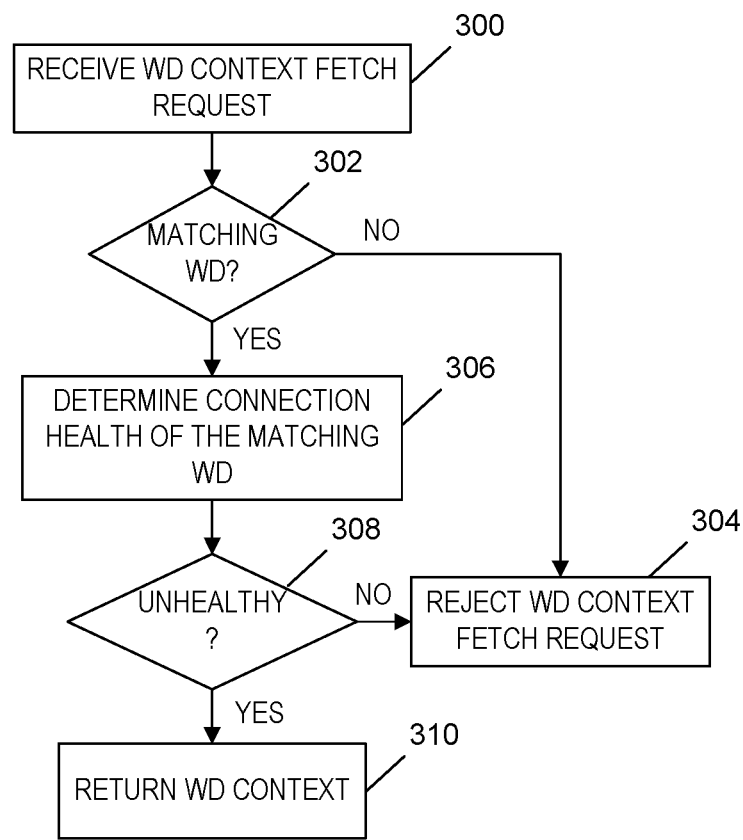
FIG. 7 is a flow chart that illustrates the operation of a candidate source base station to process a wireless device context fetch from the target base station according to some embodiments of the present disclosure.

FIG. 7 is a flow chart that illustrates the operation of a candidate source base station 16 to process a WD context fetch from the target base station 16 according to some embodiments of the present disclosure. In particular, FIG. 7 illustrates steps 210, 212, 214, and 216 of FIGS. 6A and 6B in more detail. As illustrated, the candidate source base station 16 receives the WD context fetch request from the target base station 16 (step 300) and determines whether there is a matching wireless device 20 for the corresponding candidate source cell 18 (step 302). If there is no matching wireless device 20 for the candidate source cell 18, the candidate base station 16 rejects the WD context fetch request (step 304). However, if there is a matching wireless device 20, the candidate source base station 16 determines the health of the connection between the matching wireless device 20 and the candidate source cell 18, as discussed above (step 306) and determines whether the connection is unhealthy (step 308). If the connection is healthy, the candidate source base station 16 rejects the WD context fetch request (step 304). However, if the connection is unhealthy, the candidate base station 16 returns the WD context of the matching wireless device 20 to the target base station 16 as the context of the wireless device 20 (step 310).

Figure 8A:
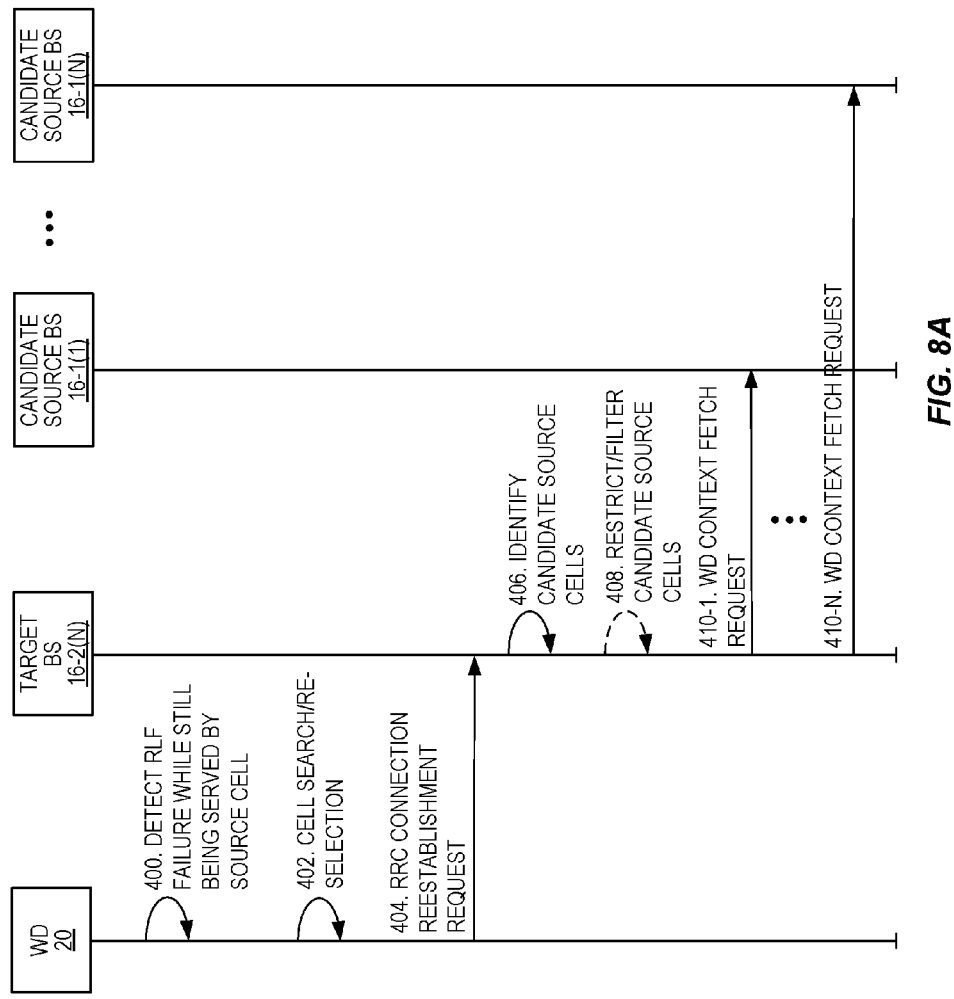
FIGS. 8A and 8B are a more detailed illustration of the connection reestablishment procedure of FIG. 5 according to some other embodiments of the present disclosure.
Figure 8B:
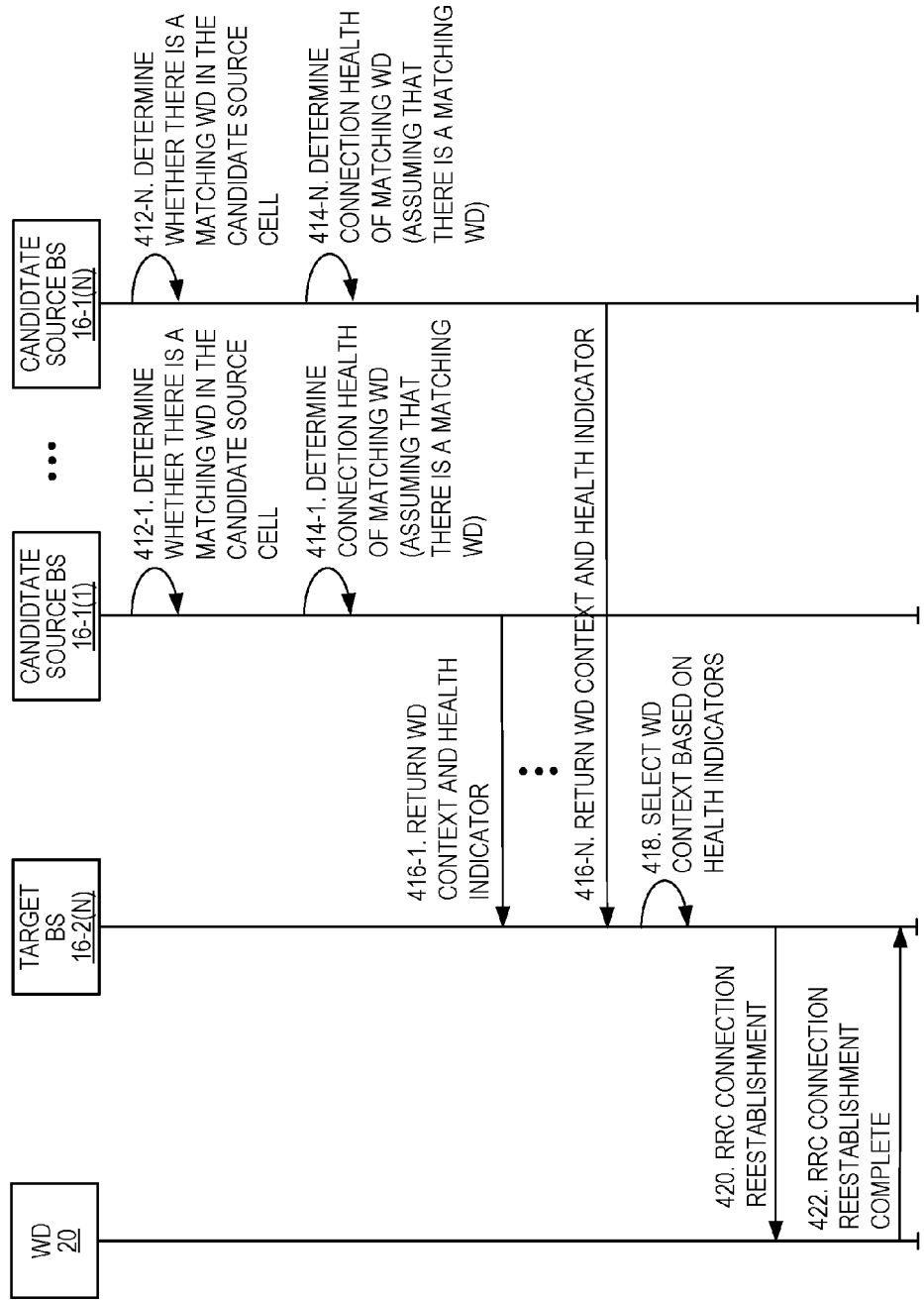

FIGS. 8A and 8B are a more detailed illustration of the connection reestablishment procedure of FIG. 5 according to some other embodiments of the present disclosure. The illustrated procedure is similar to that of FIGS. 6A and 6B but where WD contexts are returned for all candidate source cells 18 having matching wireless devices 20. Indicators of the health of the connections between the matching wireless devices 20 and the corresponding candidate source cells 18 are also returned to the target base station 16. The target base station 16 then uses the health indicators to select one of the WD contexts as the context of the wireless device 20 to use to complete the RRC Connection Reestablishment procedure.

Steps 400 through 414 are the same as steps 200 through 214 of FIGS. 6A and 6B. As such, the details are not repeated. After determining the health of the connections between the matching wireless devices 20 and the corresponding candidate source cells 18, the candidate source base stations 16 then return, to the target base station 16-2(N), the WD contexts of the matching wireless devices 20 and health indicators that are indicative of the health of the corresponding connections. Thus, for example, the candidate source base station 16-1(1) returns the context of the matching wireless device 20 for the candidate source cell 18-1(N) and a health indicator that is indicative of the health of the connection between that matching wireless device 20 and the candidate source cell 18-1(N) (step 416-1). The health indicator may be, for example, a single bit that is set to one value (e.g., 1) if the connection is unhealthy and another value (e.g., 0) if the connection is healthy. However, the health indicator is not limited thereto. In other embodiments, the health of a connection may be expressed as one of multiple values (e.g., a range of 0 to 3) where each value corresponds to a different "health" (e.g., very unhealthy, moderately unhealthy, moderately healthy, and very healthy). The other candidate source base stations 16 proceed in the same manner (step 416-N). Thus, the target base station 16-2(N) receives WD contexts and health indicators from, or for, all candidate source cells 18 having matching wireless devices 20.

The target base station 16-2(N) then selects one of the WD contexts returned by the candidate source base stations 16-1(1) through 16-1(N) as the context of the wireless device 20 (step 418). For example, the target base station 16-2(N) selects the WD context having an "unhealthy" health indicator or having the worst or poorest health indicator. If more than one of the candidate source cells 18-1(1) through 18-1(N) returns an unhealthy indicator or the poorest health indicator, then the target base station 16-2(N) selects one of the corresponding WD contexts as the context of the wireless device 20 using any suitable selection technique (e.g., random or based on one or more predefined criteria). For example, when selecting one of the contexts, the target base station 16-2(N) may consider predefined side information that indicates (explicitly or implicitly) which of the contexts is most likely to be the correct context for the wireless device 20. This side information may be, for example, mobility history information obtained by the target base station 16-2(N) for the corresponding candidate source cells 18. For example, if there are certain neighbor relations where mobility fails more frequently than others (e.g., a high frequency of RLFs), this information may be used by the target base station 16-2(N) to select the context received from the candidate source cell 18 corresponding to the neighbor relation with the poorest mobility history.

At this point, the target base station 16-2(N) has obtained the context of the wireless device 20 (or at least the context that it can assume is the context of the wireless device 20). As such, the target base station 16-2(N) uses this context to complete the RRC Connection Reestablishment procedure by sending an RRC Connection Reestablishment message to the wireless device 20 (step 420). In response, the target base station 16-2(N) receives an RRC Connection Reestablishment Complete message from the wireless device 20 (step 422).

Figure 9:
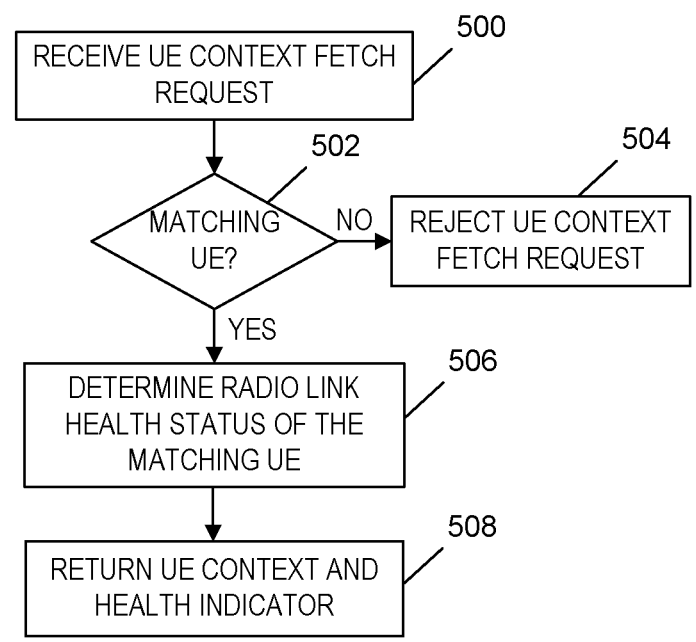
FIG. 9 is a flow chart that illustrates the operation of a candidate source base station to process a wireless device context fetch from the target base station according to some embodiments of the present disclosure.

FIG. 9 is a flow chart that illustrates the operation of a candidate source base station 16 to process a WD context fetch from the target base station 16 according to some embodiments of the present disclosure. In particular, FIG. 9 illustrates steps 410, 412, 414, and 416 of FIGS. 8A and 8B in more detail. As illustrated, the candidate source base station 16 receives the WD context fetch request from the target base station 16 (step 500) and determines whether there is a matching wireless device 20 for the corresponding candidate source cell 18 (step 502). If there is no matching wireless device 20 for the candidate source cell 18, the candidate base station 16 rejects the WD context fetch request (step 504). However, if there is a matching wireless device 20, the candidate source base station 16 determines the health of the connection between the matching wireless device 20 and the candidate source cell 18, as discussed above (step 506). The candidate base station 16 returns the WD context of the matching wireless device 20 and an indicator of the health of the connection, as determined by step 506, to the target base station (step 508).

Figure 10:
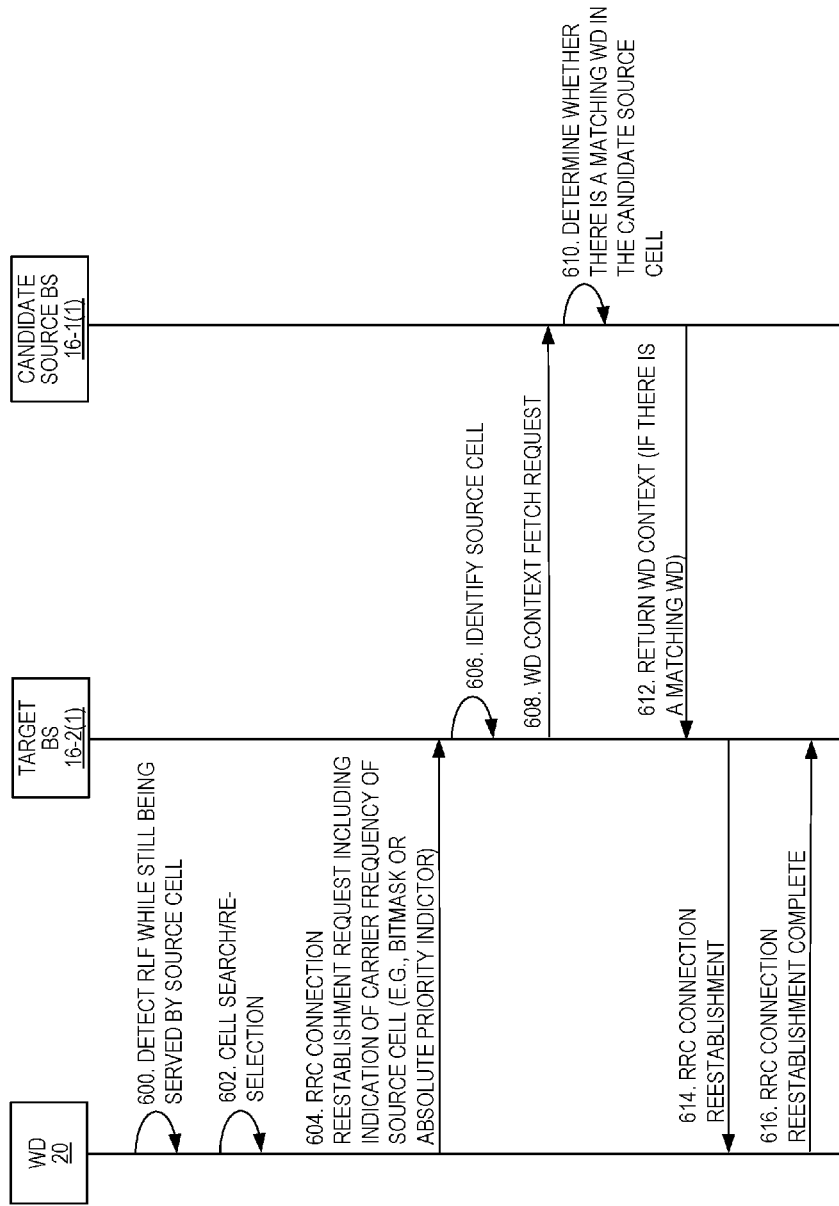
FIG. 10 illustrates an RRC Connection Reestablishment procedure that utilizes additional information provided by the wireless device to mitigate the problem of Physical Cell Identifier (PCI) confusion according to some embodiments of the present disclosure.

Thus far, the embodiments have focused on functionality at the base stations 16 to mitigate the problem of PCI confusion. FIG. 10 illustrates an RRC Connection Reestablishment procedure that utilizes additional information provided by the wireless device 20 to mitigate the problem of PCI confusion according to some embodiments of the present disclosure. As illustrated, while being served by a source cell 18, the wireless device 20 detects, or declares, an RLF (step 600). In response, the wireless device 20 performs a cell search procedure whereby the wireless device 20 (re)selects a target cell 18 controlled by a target base station 16 (step 602). In this example, the target cell 18 is the cell 18-2(1) and, as such, the target base station 16 is the based station 16-2(1). As such, for this example, the cell 18-2(1) is referred to as the target cell 18-2(1), and the base station 16-2(1) is referred to as the target base station 16-2(1). Similarly, in this example, the cell 18-1(1) is the source cell and, as such, is referred to in this example as the source cell 18-1(1).

The wireless device 20 then initiates the RRC Connection Reestablishment procedure by sending an RRC Connection Reestablishment Request message to the target base station 16-2(1) (step 604). The RRC Connection Reestablishment Request message includes the PCI of the source cell 18-1(1) of the wireless device 20 as well as the C-RNTI of the wireless device 20 in the source cell 18-1(1). In addition, in this embodiment, the RRC Connection Reestablishment Request message includes an indication of the carrier frequency of the source cell 18-1(1) of the wireless device 20. Notably, while the indication of the carrier frequency is included in the RRC Connection Reestablishment Request message in this embodiment, the present disclosure is not limited thereto. The indication of the carrier frequency of the source cell 18-1(1) may otherwise be provided to the target base station 16-2(1).

Figure 11:
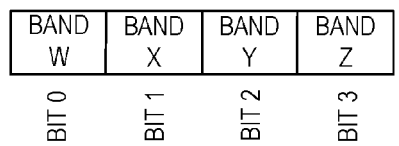
FIG. 11 illustrates one example of a bitmask that may be used to convey the additional information of FIG. 10 according to some embodiments of the present disclosure.

In some embodiments, the indication of the carrier frequency of the source cell 18-1(1) of the wireless device 20 is included in the RRC Connection Reestablishment Request message as a new information field. For example, the new information field may be a bitmask that is used to specify the carrier frequency, or carrier frequency band, corresponding to the source cell 18-1(1) where the wireless device 20 declared the RLF. Since operators typically own a limited number of frequency bands, the bitmask may be only a few bits long. One example of the bitmask is illustrated in FIG. 11. In the example of FIG. 11, there are four frequency bands (Bands W, X, Y, and Z), and a length-4 bitmask could be defined such that the bit corresponding to the frequency band of the source cell 18-1(1) is set to one value (e.g., 1) and the bits corresponding to all other frequency bands are set to another value (e.g., 0). Thus, using such a bitmask, the wireless device 20 sets the bitmask to indicate the frequency band of the source cell 18-1(1) as either frequency band W, X, Y, or Z (e.g., 0010 indicates Band Y).

When using a bitmask to convey the indication of the carrier frequency of the source cell 18-1(1), the wireless device 20 and the target base station 16-2(1) should have a common understanding of the mapping of the bits in the bitmask to the corresponding frequency bands. In this regard, in some embodiments, the target base station 16-2(1) includes a new information field as part of the system information broadcast by the target base station 16-2(1) that defines the mapping. Since the system information is static for a given operator, the system information is only broadcasted very infrequently. In other embodiments, the mapping between bits in the bitmask and the frequency bands is predefined and hardcoded into the wireless device 20 (e.g., into a Subscriber Identity Module (SIM) card supplied by the operator and embedded in the wireless device 20). All base stations 16 in the operator's network could then be programmed with the same mapping information. For roaming users (e.g., SIM cards from a different operator's network), the bitmask may be set to some default values (e.g., all zeros) to thereby indicate that the functionality of FIG. 10 is disabled. Note that the bitmask is only an example and the frequency band, or carrier frequency, of the source cell 18-1(1) may be indicated to the target base station 16-2(1) in any suitable manner (e.g., by any suitable type of data structure in the RRC Connection Reestablishment Request message).

The PCI confusion may be resolved by taking advantage of the fact that some operators use an E-UTRAN Global Cell Identifier (ECGI) assignment scheme within their networks that indicates which frequency band is used. For example, in some embodiments, a fixed number of bits at a fixed location in the 28 bit ECGI indicates the frequency band of the cell 18. Based on this assignment scheme, the target base station 16-2(1) is able to determine the frequency band corresponding to each cell 18 in the neighbor list of the target cell 18-2(1). Hence, with the frequency band bitmask contained in the RRC Connection Reestablishment Request message, the target base station 16-2(1) can narrow down the multiple neighbor list entries with the same PCI to just one.

An alternative to this embodiment is for the wireless device 20 to include an absolute priority indicator corresponding to the carrier frequency of the source cell 18-1(1) (i.e., the cell 18 where the RLF was declared) in the RRC Connection Reestablishment message. Currently, since 3GPP has standardized only eight priority levels, this information may be encoded in as few as 3 bits. As long as different carriers are assigned different priorities and the same priority definitions are used in both the source and target cells 18, then the target base station 16-2(1) may uniquely identify the carrier of the source cell 18-1(1) based on the absolute priority of the source cell 18-1(1). As above, this allows the target base station 16-2(1) to narrow down the multiple neighbor list entries with the same PCI to just one.

Notably, if the same priority definitions are not used in both the source and target cells 18, then the priority definitions between cells 18 may be exchanged between the base stations 16 (e.g., over the X2 interface) with, e.g., a newly defined message. In some embodiments, this message exchange may only be done on a very infrequent basis (e.g., only if/when the priority definitions are modified).

Returning to FIG. 10, the target base station 16-2(1) selects a candidate source cell 18 for the wireless device 20 (step 606). More specifically, the target base station 16-2(1) selects the cell 18 in the neighbor list of the target cell 18-2(1) having a PCI that matches the PCI in the RRC Connection Reestablishment Request message and a carrier frequency/frequency band that matches the carrier frequency/frequency band indicated in the RRC Connection Reestablishment Request. In this example, the candidate source cell 18 is the cell 18-1(1). The target base station 16-2(1) then sends a WD context fetch request to the base station 16-1(1) controlling the candidate source cell 18-1(1) (step 608). In response, the candidate source base station 16-1(1) then determines whether there is a matching wireless device 20 for the candidate source cell 18-1(1) (step 610). In particular, the candidate source base station 16-1(1) determines whether a WD context is available for the candidate source cell 18-1(1) for a wireless device 20 having a C-RNTI that matches that in the WD context fetch request. If so, the candidate source base station 16-1(1) returns the WD context for the matching wireless device 20 for the candidate source cell 18-1(1) to the target base station 16-2(1) (step 612). The RRC Connection Reestablishment procedure is then completed using the WD context obtained by the WD context fetch as the context of the wireless device 20 (steps 614 and 616).

Figure 12:
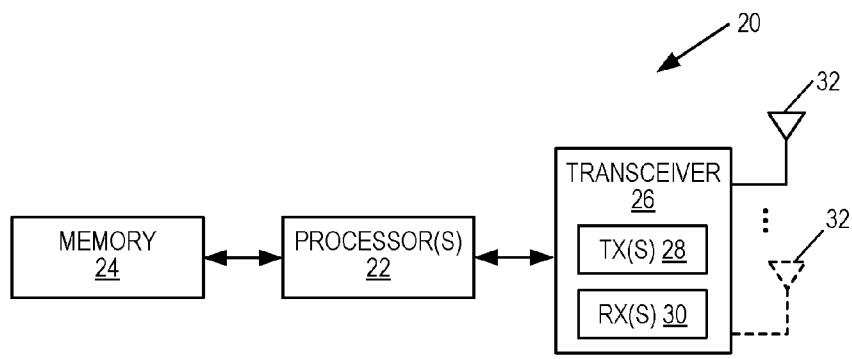
FIG. 12 is a block diagram of a wireless device according to some embodiments of the present disclosure.

FIG. 12 is a block diagram of the wireless device 20 according to some embodiments of the present disclosure. As illustrated, the wireless device 20 includes one or more processors 22 (e.g., Central Processing Unit(s) (CPU(s)), Application Specific Integrated Circuit(s) (ASIC(s)), Field Programmable Gate Array(s) (FPGA(s))), memory 24, and a transceiver 26 including one or more transmitters 28 and one or more receivers 30 coupled to one or more antennas 32. As will be appreciated by one of ordinary skill in the art, the transmitter(s) 28 and receiver(s) 30 include various analog and, in some cases, digital components such as, for example, digital-to-analog converters, analog-to-digital converters, filters, mixers, amplifiers, etc. In some embodiments, the functionality of the wireless device 20 described herein is implemented in software stored in the memory 24, where the software is executed by the processor(s) 22 such that the wireless device 20 operates according to any of the embodiments described herein.

In some embodiments, a computer program including instructions which, when executed by at least one processor, causes the at least one processor to carry out the functionality of the wireless device 20 according to any of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 24).

Figure 13:
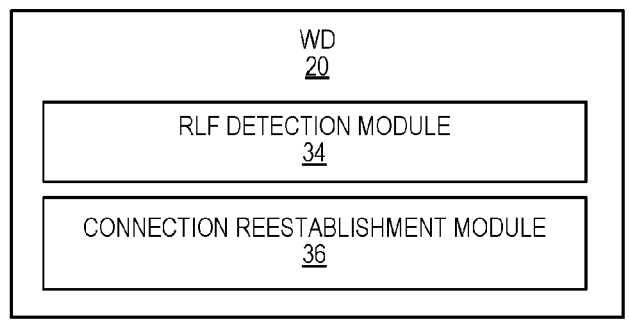
FIG. 13 is a block diagram of a wireless device according to some other embodiments of the present disclosure.

FIG. 13 is a block diagram of the wireless device 20 according to some other embodiments of the present disclosure. As illustrated, the wireless device 20 includes a RLF detection module 34 and a connection reestablishment module 36, each of which is implemented in software. In some embodiments, the RLF detection module 34 operates to detect, or declare, an RLF for the connection between the wireless device 20 and its serving cell 18. The connection reestablishment module 36 operates to, in response to an RLF detected or declared by the RLF detection module 34, send and receive (via associated transmitter(s) 28 and receiver(s) 30 of the wireless device 20) messages related to connection reestablishment. In particular, the connection reestablishment module 36 sends (via the associated transmitter 28 of the wireless device 20) a connection reestablishment message to a desired target cell 18, as described above.

FIG. 14 is a block diagram of the base station 16 according to some embodiments of the present disclosure. Notably, this description is more generally applicable to any radio access node. As illustrated, the base station 16 includes a baseband unit 38 including one or more processors 40 (e.g., CPU(s), ASIC(s), and/or FPGA(s)), memory 42, and a network interface 44. The base station 16 also includes a radio unit 46 including one or more transmitters 48 and one or more receivers 50 coupled to one or more antennas 52. In some embodiments, the functionality of the base station 16 is implemented in software and stored in the memory 42 for execution by the processor(s) 40.

In some embodiments, a computer program including instructions which, when executed by at least one processor, causes the at least one processor to carry out the functionality of the base station 16 (or more generally radio access node) according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 42).

FIG. 15 is a block diagram of the base station 16 according to some other embodiments of the present disclosure. Again, this discussion is more generally applicable to a radio access node. This embodiment is particularly focused on the functionality of the base station 16 when operating as the target base station 16 for a connection reestablishment request from the wireless device 20. As illustrated, the base station 16 includes a connection reestablishment request reception module 54, a candidate source cell identification module 56, a candidate source cell restriction module 58 (optional), a WD context fetch module 60, a context selection module 62 (optional), and a connection reestablishment module 64, each of which is implemented in software. Together, these modules 54 through 64 operate to provide the functionality of any of the embodiments described herein and, as such, much of the details are not repeated here.

The connection reestablishment request reception module 54 operates to receive (via an associated receiver 50 of the base station 16) a connection reestablishment request from the wireless device 20. In response, the candidate source cell identification module 56 operates to identify a number of cells 18 from the neighbor list of the target cell 18 as candidate source cells 18 for the wireless device 20. Optionally, the candidate source cell restriction module 58 operates to restrict or filter the set of candidate source cells 18 identified by the candidate source cell identification module 56 to provide a restricted set of candidate source cells 18. The WD context fetch module 60 then performs a WD context fetch for the context of the wireless device 20 from each of the candidate source cells 18 (or alternatively each candidate source cell 18 in the restricted set). In response, the WD context fetch module 60 receives a WD context from at least one of the candidate source cells 18, depending on the particular embodiment. Optionally, the context selection module 62 operates to select one of the WD contexts received by the WD context fetch module 60 as the context of the wireless device 20 from which the connection reestablishment request was received. Lastly, the connection reestablishment module 64 operates to complete the connection reestablishment procedure using the context of the wireless device 20.

FIG. 16 is a block diagram of the base station 16 according to some other embodiments of the present disclosure. Again, this discussion is more generally applicable to a radio access node. This embodiment is particularly focused on the functionality of the base station 16 when operating as a candidate source base station 16 for wireless device 20 with respect to a connection reestablishment procedure to a target cell 18. As illustrated, the base station 16 includes a WD context fetch request reception module 66, a matching WD identification module 68, a health determination module 70 (optional), and a WD context fetch response module 72, each of which is implemented in software. Together, these modules 66 through 72 operate to provide the functionality of any of the embodiments described herein and, as such, much of the details are not repeated here.

The WD context fetch request reception module 66 operates to receive (via an associated network interface 44 of the base station 16) a WD context fetch request from a target base station 16 for a connection reestablishment request from the wireless device 20. The matching WD identification module 68 operates to determine whether there is a matching wireless device 20 for the corresponding candidate source cell 18. In some embodiments, the health determination module 70 operates to determine the health of the connection between the matching wireless device 20 (if any) and the corresponding candidate source cell 18. The WD context fetch response module 72 responds to the WD context fetch request. For instance, as discussed above, the WD context fetch response module 72 rejects the WD context fetch request if there is no matching wireless device 20 or, in some embodiments, if the health of the connection for the matching wireless device 20 is healthy (i.e., better than some predefined threshold). Conversely, the WD context fetch response module 72 returns the WD context of the matching device 20 if there is in fact a matching wireless device 20 and, in some embodiments, if the connection for the matching wireless device 20 is unhealthy (i.e., worse than some predefined threshold). In addition, as discussed above, in some embodiments, the WD context fetch response module 72 returns a health indicator for the connection of the matching wireless device 20.

Embodiments of the systems and methods disclosed herein provide numerous benefits and advantages. While not being limited to or by any benefits or advantages, in some embodiments, the systems and methods disclosed herein provide higher RRC connection reestablishment success rates, reduced signaling to the core network, reduced service interruption time, and improved retainability.

The following acronyms are used throughout this disclosure.

3GPP $3^{rd}$ Generation Partnership Project
ACK Acknowledgement
ASIC Application Specific Integrated Circuit
C-RNTI Cell Radio Network Temporary Identifier
CPU Central Processing Unit
CQI Channel Quality Information
DRB Data Radio Bearer
E-UTRAN Evolved Universal Terrestrial Radio Access Network
ECGI Evolved Universal Terrestrial Radio Access Network Global Cell Identifier
eNB Enhanced or Evolved Node B
EPC Evolved Packet Core
EPS Evolved Packet System
FPGA Field Programmable Gate Array
HARQ Hybrid Automatic Repeat Request
IE Information Element
LTE Long Term Evolution
MME Mobile Management Entity
NACK Negative Acknowledgement
P-GW Packet Data Network Gateway
PCI Physical Cell Identifier
PDCCH Physical Downlink Control Channel
RAN Radio Access Network
RLC Radio Link Control
RLF Radio Link Failure
RNC Radio Network Controller
RRC Radio Resource Control
RRH Remote Radio Head
S1AP S1 Application Protocol
S-GW Serving Gateway
SIM Subscriber Identity Module
SR Scheduling Request
SRB Signaling Radio Bearer
TS Technical Specification
UE User Equipment
UMTS Universal Mobile Telecommunications System
VoLTE Voice over Long Term Evolution Those skilled in the art will recognize improvements and modifications to the embodiments of the present disclosure. All such improvements and modifications are considered within the scope of the concepts disclosed herein and the claims that follow.

What is claimed is:

1. A radio access node in a cellular communications system enabling connection reestablishment for a wireless device to a target cell controlled by the radio access node, comprising:
   at least one transmitter and at least one receiver configured to enable wireless communication between the radio access node and the wireless device;
   a network interface configured to enable communication between the radio access node and one or more other radio access nodes;
   at least one processor; and
   memory containing instructions executable by the at least one processor whereby the radio access node is operative to:
      receive a connection reestablishment request from the wireless device via the at least one receiver where the connection reestablishment request comprises an indication of a carrier frequency of a source cell of the wireless device;
      identify a candidate source cell for the wireless device having a cell identifier that matches a cell identifier of the source cell of the wireless device and a carrier frequency that matches the carrier frequency of the source cell of the wireless device based on the connection reestablishment request where the indication of the carrier frequency of the source cell of the wireless device is an absolute priority of the carrier frequency of the source cell of the wireless device and different carrier frequencies are assigned different absolute priorities;
      send, via the network interface, a context fetch request for a context for the wireless device to a candidate source radio access node controlling the candidate source cell identified for the wireless device; and
      receive, via the network interface, the context for the wireless device from the candidate source radio access node in response to the context fetch request.

2. The radio access node of claim 1 wherein, via the instructions executable by the at least one processor, the radio access node is further operative to complete connection reestablishment with the wireless device to the target cell based on the context for the wireless device received from the candidate source radio access node.

3. The radio access node of claim 1 wherein a cause of the connection reestablishment request is a radio link failure for the wireless device while the wireless device is being served by the source cell.

4. The radio access node of claim 1 wherein:
   the candidate source cell for the wireless device is one of two or more neighboring cells of the target cell having the same cell identifier as the source cell of the wireless device.

5. The radio access node of claim 4 wherein the cellular communications system comprises a plurality of cells for each of at least two carrier frequencies where at least some of the plurality of cells for the at least two carrier frequencies are assigned the same cell identifiers.

6. The radio access node of claim 1 wherein the cellular communications system is a 3$^{rd}$ Generation Partnership Project, 3GPP, Long Term Evolution, LTE, network.

7. A method of operation of a radio access node in a cellular communications system to enable connection reestablishment for a wireless device to a target cell controlled by the radio access node, comprising:
   receiving a connection reestablishment request from the wireless device where the connection reestablishment request comprises an indication of a carrier frequency of a source cell of the wireless device;
   identifying a candidate source cell for the wireless device having a cell identifier that matches a cell identifier of the source cell of the wireless device and a carrier frequency that matches the carrier frequency of the source cell of the wireless device based on the connection reestablishment request where the indication of the carrier frequency of the source cell of the wireless device is an absolute priority of the carrier frequency of the source cell of the wireless device and different carrier frequencies are assigned different absolute priorities;
   sending a context fetch request for a context for the wireless device to a candidate source radio access node controlling the candidate source cell identified for the wireless device; and
   receiving the context for the wireless device from the candidate source radio access node in response to the context fetch request.

8. A wireless device in a cellular communications system enabling connection reestablishment for the wireless device to a target cell controlled by a target radio access node, comprising:
   at least one transmitter and at least one receiver configured to enable wireless communication between the wireless device and the target radio access node;
   at least one processor; and
   memory containing instructions executable by the at least one processor whereby the wireless device is operative to:
      transmit a connection reestablishment request to the target radio access node via the at least one transmitter, the connection reestablishment request comprising an indication of a carrier frequency of a source cell of the wireless device where the indication of the carrier frequency of the source cell of the wireless device is an absolute priority of the carrier frequency of the source cell of the wireless device and different carrier frequencies are assigned different absolute priorities; and
      in response, receive a connection reestablishment message from the target radio access node via the at least one receiver.

9. The wireless device of claim 8 wherein, via the instructions executable by the at least one processor, the wireless device is further operative to:
   detect a radio link failure for the wireless device with respect to the source cell of the wireless device;
   select the target cell, the target cell being controlled by the target radio access node; and
   transmit the connection reestablishment request to the target radio access node in response to detecting the radio link failure and selecting the target cell.

10. The wireless device of claim 8 wherein the indication of the carrier frequency of the source cell of the wireless device is one or more bit values that are mapped to a predefined carrier frequency.

11. The wireless device of claim 8 wherein the cellular communications system is a 3$^{rd}$ Generation Partnership Project, 3GPP, Long Term Evolution, LTE, network.

12. A method of operation of a wireless device in a cellular communications system to enable connection reestablishment for the wireless device to a target cell controlled by a target radio access node, comprising:
   transmitting a connection reestablishment request to the target radio access node, the connection reestablishment request comprising an indication of a carrier frequency of a source cell of the wireless device; and in response, receiving a connection reestablishment message from the target radio access node, wherein the indication of the carrier frequency of the source cell of the wireless device is an absolute priority of the carrier frequency of the source cell of the wireless device, where different carrier frequencies are assigned different absolute priorities.

* * * * *